US007107110B2

(12) United States Patent
Fay et al.

(10) Patent No.: US 7,107,110 B2
(45) Date of Patent: Sep. 12, 2006

(54) AUDIO BUFFERS WITH AUDIO EFFECTS

(75) Inventors: Todor J. Fay, Bellevue, WA (US); Brian L. Schmidt, Bellevue, WA (US); Dugan O. Porter, Redmond, WA (US); James F. Geist, Jr., Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 941 days.

(21) Appl. No.: 10/092,740

(22) Filed: Mar. 5, 2002

(65) Prior Publication Data

US 2002/0122559 A1 Sep. 5, 2002

Related U.S. Application Data

(60) Provisional application No. 60/273,660, filed on Mar. 5, 2001.

(51) Int. Cl.
*G06F 17/00* (2006.01)
*H04B 1/00* (2006.01)

(52) U.S. Cl. ........................................ 700/94; 381/119

(58) Field of Classification Search ................ 381/119, 381/61; 710/52, 56; 700/94
See application file for complete search history.

(56) References Cited

U.S. PATENT DOCUMENTS 5,142,961 A 9/1992 Paroutaud
5,303,218 A 4/1994 Miyake
5,315,057 A 5/1994 Land et al.
5,331,111 A * 7/1994 O'Connell .................. 84/602
5,511,002 A 4/1996 Milne et al.
5,548,759 A 8/1996 Lipe
5,717,154 A 2/1998 Gulick
5,734,119 A 3/1998 France et al.
5,761,684 A 6/1998 Gibson
5,768,545 A 6/1998 Solomon et al.
5,778,187 A 7/1998 Monteiro et al.
5,792,971 A 8/1998 Timis et al.
5,842,014 A 11/1998 Brooks et al.
5,852,251 A 12/1998 Su et al.
5,890,017 A 3/1999 Tulkoff et al.
5,902,947 A 5/1999 Burton et al.
5,942,707 A 8/1999 Tamura
5,977,471 A 11/1999 Rosenzweig
5,990,879 A 11/1999 Mince
6,100,461 A 8/2000 Hewitt
6,152,856 A 11/2000 Studor et al.
6,160,213 A 12/2000 Arnold et al.

(Continued)

OTHER PUBLICATIONS

Inside DirectX, Bradely Bargen and Peter Donnelly, (Microsoft Press; 1998).*

(Continued)

*Primary Examiner*—Sinh Tran
*Assistant Examiner*—Andrew Flanders
(74) *Attorney, Agent, or Firm*—Lee & Hayes, PLLC

(57) ABSTRACT

An audio buffer includes one or more audio effects that modify audio data received from an audio data source. A first audio effect in the audio buffer receives audio data from the audio data source and modifies the audio data to generate a stream of audio data. Subsequent audio effects in the audio buffer receives the stream of audio data from the first audio effect and further modifies the audio data to generate a stream of modified audio data. The stream of modified audio data is then routed from the audio buffer to a second audio buffer, or communicated to an audio rendering component that produces an audio rendition corresponding to the modified audio data.

48 Claims, 9 Drawing Sheets

U.S. PATENT DOCUMENTS

| | | | | |
|---|---|---|---|---|
| 6,169,242 | B1 | 1/2001 | Fay et al. | |
| 6,173,317 | B1 | 1/2001 | Chaddha et al. | |
| 6,175,070 | B1 | 1/2001 | Naples et al. | |
| 6,180,863 | B1 * | 1/2001 | Tamura | 84/603 |
| 6,216,149 | B1 | 4/2001 | Conner et al. | |
| 6,225,546 | B1 | 5/2001 | Kraft et al. | |
| 6,233,389 | B1 | 5/2001 | Barton et al. | |
| 6,301,603 | B1 | 10/2001 | Maher et al. | |
| 6,357,039 | B1 | 3/2002 | Kuper | |
| 6,433,266 | B1 | 8/2002 | Fay et al. | |
| 6,541,689 | B1 | 4/2003 | Fay et al. | |
| 6,628,928 | B1 | 9/2003 | Crosby et al. | |
| 6,640,257 | B1 | 10/2003 | MacFarlane | |
| 6,658,309 | B1 * | 12/2003 | Abrams et al. | 700/94 |
| 2001/0053944 | A1 | 12/2001 | Marks et al. | |
| 2002/0108484 | A1 | 8/2002 | Arnold et al. | |
| 2002/0144587 | A1 | 10/2002 | Naples et al. | |
| 2002/0144588 | A1 | 10/2002 | Naples et al. | |

OTHER PUBLICATIONS

Vercoe, et al; "Real-Time CSOUND: Software Synthesis with Sensing and Control"; ICMC Glasgow 1990 for the Computer Music Association; pp. 209 through 211.

Harris, et al.; "The Application of Embedded Transputers in a Professional Digital Audio Mixing System"; IEEE Colloquium on "Transputer Applications"; Digest No. 129, p. 2/1-3 (UK Nov. 13, 1989).

Veroce, Barry; "New Dimensions in Computer Music"; Trends & Perspectives in Signal Processing; Focus, Apr. 1982; pp. 15 through 23.

Moorer, James; "The Lucasfilm Audio Signal Processor"; Computer Music Journal, vol. 6, No. 3, Fall 1982, 0148-9267/82/030022-11; pp. 22 through 32.

A. Camurri et al., "A Software Architecture for Sound and Music Processing", Microprocessing and Microprogramming vol. 35 pp. 625-632 (Sep. 1992).

Berry M., "An Introduction to GrainWave" Computer Music Journal Spring 1999 vol. 23 No. 1 pp. 57-61.

H. Meeks, "Sound Forge Version 4.0b", Social Science Computer Review vol. 16, No. 2, pp. 205-208(Summer 1998).

J. Piche et al., "Cecilia: A Production Interface to Csound", Computer Music Journal vol. 22, No. 2 pp. 52-55 (Summer 1998).

M. Cohen et al., "Multidimensional Audio Window Management", Int. J. Man-Machine Studies vol. 34, No. 3 pp. 319-336 (1991).

Malham et al., "3-D Sound Spatialization using Ambisonic Techniques" Computer Music Journal Winter 1995 vol. 19 No. 4 pp. 58-70.

Meyer D., "Signal Processing Architecture for Loudspeaker Array Directivity Control" ICASSP Mar. 1985 vol. 2 pp. 16.7.1-16.7.4.

Miller et al., "Audio-Enhanced Computer Assisted Learning and Computer Controlled Audio-Instruction". Computer Education, Pergamon Press Ltd., 1983, vol. 7 pp. 33-54.

R. Dannenberg et al., "Real-Time Software Synthesis on Superscalar Architectures", Computer Music Journal vol. 21, No. 3 pp. 83-94 (Fall 1997).

R. Nieberle et al., "CAMP: Computer-Aided Music Processing", Computer Music Journal vol. 15, No. 2, pp. 33-40 (Summer 1991).

Reilly et al., "Interactive DSP Debugging in the Multi-Processor Huron Environment" ISSPA Aug. 1996 pp. 270-273.

Stanojevic et al., "The Total Surround Sound (TSS) Processor" SMPTE Journal Nov. 1994 vol. 3 No. 11 pp. 734-740.

V. Ulianich, "Project FORMUS: Sonoric Space-Time and the Artistic Synthesis of Sound", Leonardo vol. 28, No. 1 pp. 63-66 (1995).

Waid, Fred; "APL and the Media"; Proceedings of the Tenth APL as a Tool of Thought Conference; held at Stevens Institute of Technology, Hoboken, New Jersey, Jan. 31, 1998: pp. 111 through 122.

Wippler, Jean-Claude; "Scripted Documents"; Proceedings of the 7th USENIX Tcl/TKConference; Austin Texas; Feb. 14-18, 2000; The USENIX Association.

* cited by examiner

AUDIO BUFFERS WITH AUDIO EFFECTS

RELATED APPLICATION

This application claims the benefit of U.S. Provisional Application No. 60/273,660, filed Mar. 5, 2001, entitled "Dynamic Buffer Creation with Embedded Hardware and Software Effects", to Todor Fay et al., which is incorporated by reference herein.

TECHNICAL FIELD

This invention relates to audio processing with an audio generation system and, in particular, to audio buffers with audio effects to modify audio data.

BACKGROUND

Multimedia programs present content to a user through both audio and video events while a user interacts with a program via a keyboard, joystick, or other interactive input device. A user associates elements and occurrences of a video presentation with the associated audio representation. A common implementation is to associate audio with movement of characters or objects in a video game. When a new character or object appears, the audio associated with that entity is incorporated into the overall presentation for a more dynamic representation of the video presentation.

Audio representation is an essential component of electronic and multimedia products such as computer based and stand-alone video games, computer-based slide show presentations, computer animation, and other similar products and applications. As a result, audio generating devices and components are integrated into electronic and multimedia products for composing and providing graphically associated audio representations. These audio representations can be dynamically generated and varied in response to various input parameters, real-time events, and conditions. Thus, a user can experience the sensation of live audio or musical accompaniment with a multimedia experience.

Conventionally, computer audio is produced in one of two fundamentally different ways. One way is to reproduce an audio waveform from a digital sample of an audio source which is typically stored in a wave file (i.e., a .wav file). A digital sample can reproduce any sound, and the output is very similar on all sound cards, or similar computer audio rendering devices. However, a file of digital samples consumes a substantial amount of memory and resources when streaming the audio content. As a result, the variety of audio samples that can be provided using this approach is limited. Another disadvantage of this approach is that the stored digital samples cannot be easily varied.

Another way to produce computer audio is to synthesize musical instrument sounds, typically in response to instructions in a Musical Instrument Digital Interface (MIDI) file, to generate audio sound waves. MIDI is a protocol for recording and playing back music and audio on digital synthesizers incorporated with computer sound cards. Rather than representing musical sound directly, MIDI transmits information and instructions about how music is produced. The MIDI command set includes note-on, note-off, key velocity, pitch bend, and other commands to control a synthesizer.

The audio sound waves produced with a synthesizer are those already stored in a wavetable in the receiving instrument or sound card. A wavetable is a table of stored sound waves that are digitized samples of actual recorded sound. A wavetable can be stored in read-only memory (ROM) on a sound card chip, or provided with software. Prestoring sound waveforms in a lookup table improves rendered audio quality and throughput. An advantage of MIDI files is that they are compact and require few audio streaming resources, but the output is limited to the number of instruments available in the designated General MIDI set and in the synthesizer, and may sound very different on different computer systems.

MIDI instructions sent from one device to another indicate actions to be taken by the controlled device, such as identifying a musical instrument (e.g., piano, flute, drums, etc.) for music generation, turning on a note, and/or altering a parameter in order to generate or control a sound. In this way, MIDI instructions control the generation of sound by remote instruments without the MIDI control instructions themselves carrying sound or digitized information. A MIDI sequencer stores, edits, and coordinates the MIDI information and instructions. A synthesizer connected to a sequencer generates audio based on the MIDI information and instructions received from the sequencer. Many sounds and sound effects are a combination of multiple simple sounds generated in response to the MIDI instructions.

A MIDI system allows audio and music to be represented with only a few digital samples rather than converting an analog signal to many digital samples. The MIDI standard supports different channels that can each simultaneously provide an output of audio sound wave data. There are sixteen defined MIDI channels, meaning that no more than sixteen instruments can be playing at one time. Typically, the command input for each MIDI channel represents the notes corresponding to an instrument. However, MIDI instructions can program a channel to be a particular instrument. Once programmed, the note instructions for a channel will be played or recorded as the instrument for which the channel has been programmed. During a particular piece of music, a channel can be dynamically reprogrammed to be a different instrument.

A Downloadable Sounds (DLS) standard published by the MIDI Manufacturers Association allows wavetable synthesis to be based on digital samples of audio content provided at run-time rather than stored in memory. The data describing an instrument can be downloaded to a synthesizer and then played like any other MIDI instrument. Because DLS data can be distributed as part of an application, developers can be assured that the audio content will be delivered uniformly on all computer systems. Moreover, developers are not limited in their choice of instruments.

A DLS instrument is created from one or more digital samples, typically representing single pitches, which are then modified by a synthesizer to create other pitches. Multiple samples are used to make an instrument sound realistic over a wide range of pitches. DLS instruments respond to MIDI instructions and commands just like other MIDI instruments. However, a DLS instrument does not have to belong to the General MIDI set or represent a musical instrument at all. Any sound, such as a fragment of speech or a fully composed measure of music, can be associated with a DLS instrument.

Conventional Audio and Music System

FIG. 1 illustrates a conventional audio and music generation system 100 that includes a synthesizer 102, a sound effects input source 104, and a buffers component 106. Typically, a synthesizer is implemented in computer software, in hardware as part of a computer's internal sound card, or as an external device such as a MIDI keyboard or module. Synthesizer 102 receives MIDI inputs on sixteen channels 108 that conform to the MIDI standard. Synthesizer 102 includes a mixing component 110 that mixes the audio sound wave data output from synthesizer channels 108. An output 112 of mixing component 110 is input to an audio buffer in the buffers component 106.

MIDI inputs to synthesizer 102 are in the form of individual instructions, each of which designates the MIDI channel to which it applies. Within synthesizer 102, instructions associated with different channels 108 are processed in different ways, depending on the programming for the various channels. A MIDI input is typically a serial data stream that is parsed in synthesizer 102 into MIDI instructions and synthesizer control information. A MIDI command or instruction is represented as a data structure containing information about the sound effect or music piece such as the pitch, relative volume, duration, and the like.

A MIDI instruction, such as a "note-on", directs synthesizer 102 to play a particular note, or notes, on a synthesizer channel 108 having a designated instrument. The General MIDI standard defines standard sounds that can be combined and mapped into the sixteen separate instrument and sound channels. A MIDI event on a synthesizer channel 108 corresponds to a particular sound and can represent a keyboard key stroke, for example. The "note-on" MIDI instruction can be generated with a keyboard when a key is pressed and the "note-on" instruction is sent to synthesizer 102. When the key on the keyboard is released, a corresponding "note-off" instruction is sent to stop the generation of the sound corresponding to the keyboard key.

The audio representation for a video game involving a car, from the perspective of a person in the car, can be presented for an interactive video and audio presentation. The sound effects input source 104 has audio data that represents various sounds that a driver in a car might hear. A MIDI formatted music piece 114 represents the audio of the car's stereo. Input source 104 also has digital audio sample inputs that are sound effects representing the car's horn 116, the car's tires 118, and the car's engine 120.

The MIDI formatted input 114 has sound effect instructions 122(1–3) to generate musical instrument sounds. Instruction 122(1) designates that a guitar sound be generated on MIDI channel one (1) in synthesizer 102, instruction 120(2) designates that a bass sound be generated on MIDI channel two (2), and instruction 120(3) designates that drums be generated on MIDI channel ten (10). The MIDI channel assignments are designated when MIDI input 114 is authored, or created.

A conventional software synthesizer that translates MIDI instructions into audio signals does not support distinctly separate sets of MIDI channels. The number of sounds that can be played simultaneously is limited by the number of channels and resources available in the synthesizer. In the event that there are more MIDI inputs than there are available channels and resources, one or more inputs are suppressed by the synthesizer.

The buffers component 106 of audio system 100 includes multiple buffers 124(1–4). Typically, a buffer is an allocated area of memory that temporarily holds sequential samples of audio sound wave data that will be subsequently communicated to a sound card or similar audio rendering device to produce audible sound. The output 112 of synthesizer mixing component 110 is input to buffer 124(1) in buffers component 106. Similarly, each of the other digital sample sources are input to a buffer 124 in buffers component 106. The car horn sound effect 116 is input to buffer 124(2), the tires sound effect 118 is input to buffer 124(3), and the engine sound effect 120 is input to buffer 124(4).

Another problem with conventional audio generation systems is the extent to which system resources have to be allocated to support an audio representation for a video presentation. In the above example, each buffer 124 requires separate hardware channels, such as in a soundcard, to render the audio sound effects from input source 104. Further, in an audio system that supports both music and sound effects, a single stereo output pair that is input to one buffer is a limitation to creating and enhancing the music and sound effects.

Similarly, other three-dimensional (3-D) audio spatialization effects are difficult to create and require an allocation of system resources that may not be available when processing a video game that requires an extensive audio presentation. For example, to represent more than one car from a perspective of standing near a road in a video game, a preauthored car engine sound effect 120 has to be stored in memory once for each car that will be represented. Additionally, a separate buffer 124 and separate hardware channels will need to be allocated for each representation of a car. If a computer that is processing the video game does not have the resources available to generate the audio representation that accompanies the video presentation, the quality of the presentation will be deficient.

SUMMARY

An audio buffer includes one or more audio effects that modify audio data received from an audio data source, such as a synthesizer component or another audio buffer, for example. A first audio effect in the audio buffer receives audio data from the audio data source and modifies the audio data to generate a stream of audio data. Subsequent audio effects in the audio buffer receives the stream of audio data from the first audio effect and further modifies the audio data to generate a stream of modified audio data. The stream of modified audio data is then routed from the audio buffer to a second audio buffer, or communicated to an audio rendering component that produces an audio rendition corresponding to the modified audio data.

An audio buffer with audio effects can include an audio data input mixer to combine one or more streams of audio data received from multiple audio buffers, and generate a stream of combined audio data for input to the first audio effect. The first audio effect in the audio buffer can be instantiated as a programming object that implements software resources to modify the audio data. Similarly, a second audio effect in the audio buffer can be instantiated as a programming object that manages hardware resources to modify the audio data.

BRIEF DESCRIPTION OF THE DRAWINGS

The same numbers are used throughout the drawings to reference like features and components.

DETAILED DESCRIPTION

The following describes systems and methods to implement audio buffers with audio effects in an audio generation system that supports numerous computing systems' audio technologies, including technologies that are designed and implemented after a multimedia application program has been authored. An application program instantiates the components of an audio generation system to produce, or otherwise generate, audio data that can be rendered with an audio rendering device to produce audible sound.

Audio buffers having audio effects (or "effects") are implemented as needed in an audio generation system to receive and maintain audio data, and further process the audio data. Computing system resource allocation to create the audio buffers and the audio effects in hardware and/or software is dynamic as necessitated by a requesting application program, such as a video game or other multimedia application. An application program can optimally utilize system hardware and software resources by creating and allocating audio buffers and audio effects only when needed.

An audio generation system includes an audio rendition manager (also referred to herein as an "AudioPath") that is implemented to provide various audio data processing components that process audio data into audible sound. The audio generation system described herein simplifies the process of creating audio representations for interactive applications such as video games and Web sites. The audio rendition manager manages the audio creation process and integrates both digital audio samples and streaming audio.

Additionally, an audio rendition manager provides real-time, interactive control over the audio data processing for audio representations of video presentations. An audio rendition manager also enables 3-D audio spatialization processing for an individual audio representation of an entity's video presentation. Multiple audio renditions representing multiple video entities can be accomplished with multiple audio rendition managers, each representing a video entity, or audio renditions for multiple entities can be combined in a single audio rendition manager.

Real-time control of audio data processing components in an audio generation system is useful, for example, to control an audio representation of a video game presentation when parameters that are influenced by interactivity with the video game change, such as a video entity's 3-D positioning in response to a change in a video game scene. Other examples include adjusting audio environment reverb in response to a change in a video game scene, or adjusting music transpose in response to a change in the emotional intensity of a video game scene.

Exemplary Audio Generation System

Figure 1:
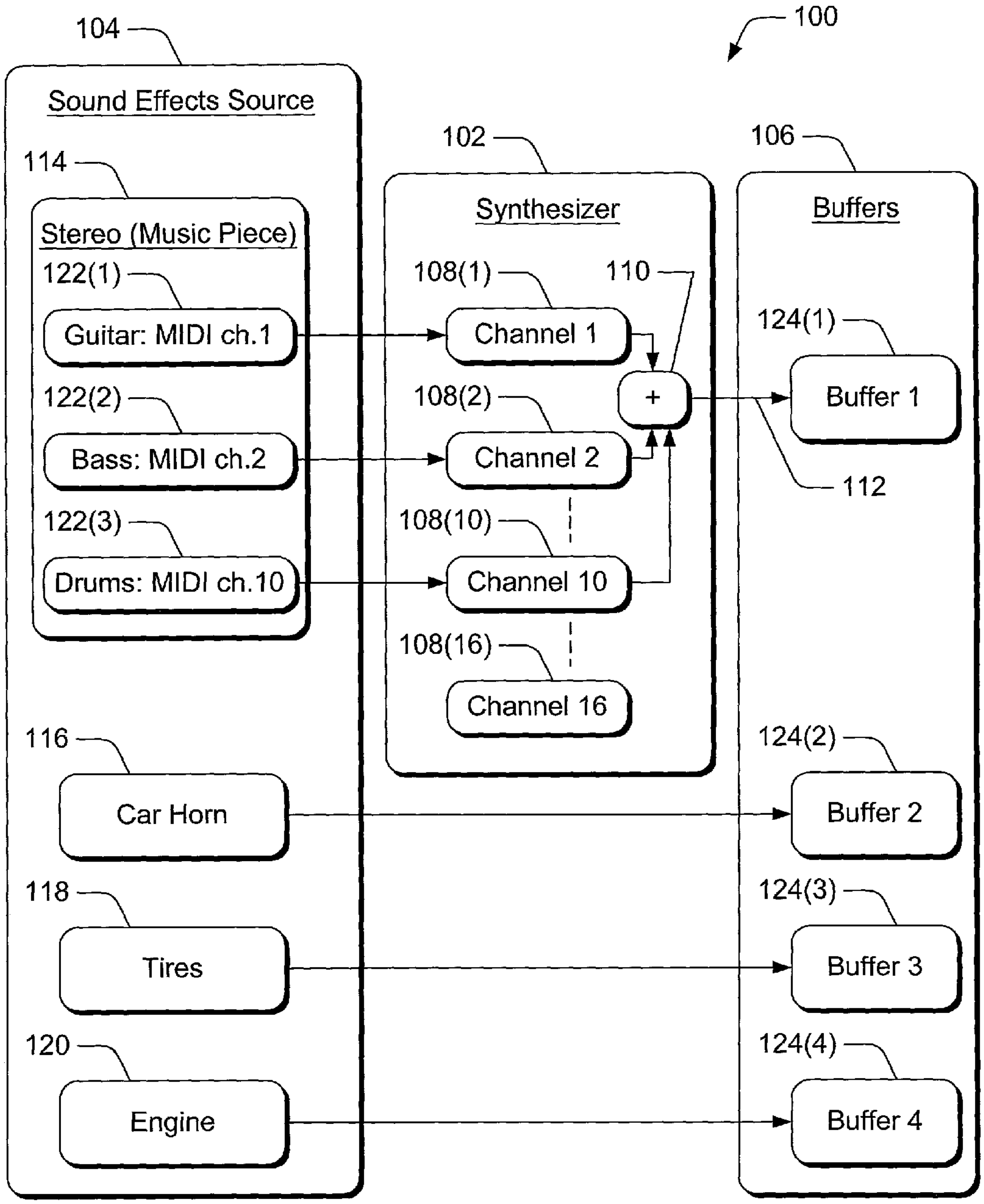
Fig. 1 Prior Art
FIG. 1 illustrates a conventional audio generation system.
Figure 2:
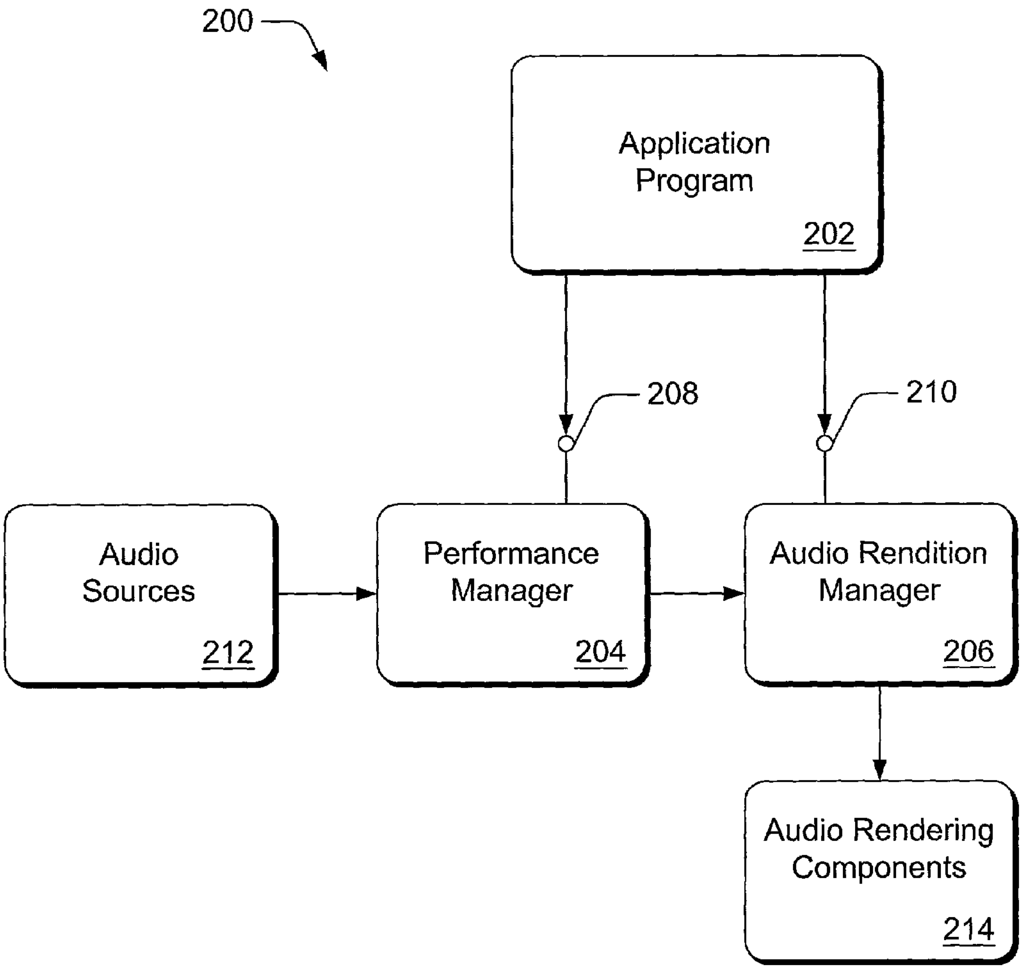
FIG. 2 illustrates various components of an exemplary audio generation system.

FIG. 2 illustrates an audio generation system 200 having components that can be implemented within a computing device, or the components can be distributed within a computing system having more than one computing device. The audio generation system 200 generates audio events that are processed and rendered by separate audio processing components of a computing device or system. See the description of "Exemplary Computing System and Environment" below for specific examples and implementations of network and computing systems, computing devices, and components that can be used to implement the technology described herein.

Audio generation system 200 includes an application program 202, a performance manager component 204, and an audio rendition manager 206. Application program 202 is one of a variety of different types of applications, such as a video game program, some other type of entertainment program, or any other application that incorporates an audio representation with a video presentation.

The performance manager 204 and the audio rendition manager 206 can be instantiated, or provided, as programming objects. The application program 202 interfaces with the performance manager 204, the audio rendition manager 206, and the other components of the audio generation system 200 via application programming interfaces (APIs). For example, application program 202 can interface with the performance manager 204 via API 208 and with the audio rendition manager 206 via API 210.

The various components described herein, such as the performance manager 204 and the audio rendition manager 206, can be implemented using standard programming techniques, including the use of OLE (object linking and embedding) and COM (component object model) interfaces. COM objects are implemented in a system memory of a computing device, each object having one or more interfaces, and each interface having one or more methods. The interfaces and interface methods can be called by application programs and by other objects. The interface methods of the objects are executed by a processing unit of the computing device. Familiarity with object-based programming, and with COM objects in particular, is assumed throughout this disclosure. However, those skilled in the art will recognize that the audio generation systems and the various components described herein are not limited to a COM and/or OLE implementation, or to any other specific programming technique.

The audio generation system 200 includes audio sources 212 that provide digital samples of audio data such as from a wave file (i.e., a .wav file), message-based data such as from a MIDI file or a pre-authored segment file, or an audio sample such as a Downloadable Sound (DLS). Audio sources can be also be stored as a resource component file of an application rather than in a separate file.

Application program 202 can initiate that an audio source 212 provide audio content input to performance manager 204. The performance manager 204 receives the audio content from audio sources 212 and produces audio instructions for input to the audio rendition manager 206. The audio rendition manager 206 receives the audio instructions and generates audio sound wave data. The audio generation system 200 includes audio rendering components 214 which are hardware and/or software components, such as a speaker or soundcard, that renders audio from the audio sound wave data received from the audio rendition manager 206.

Figure 3:
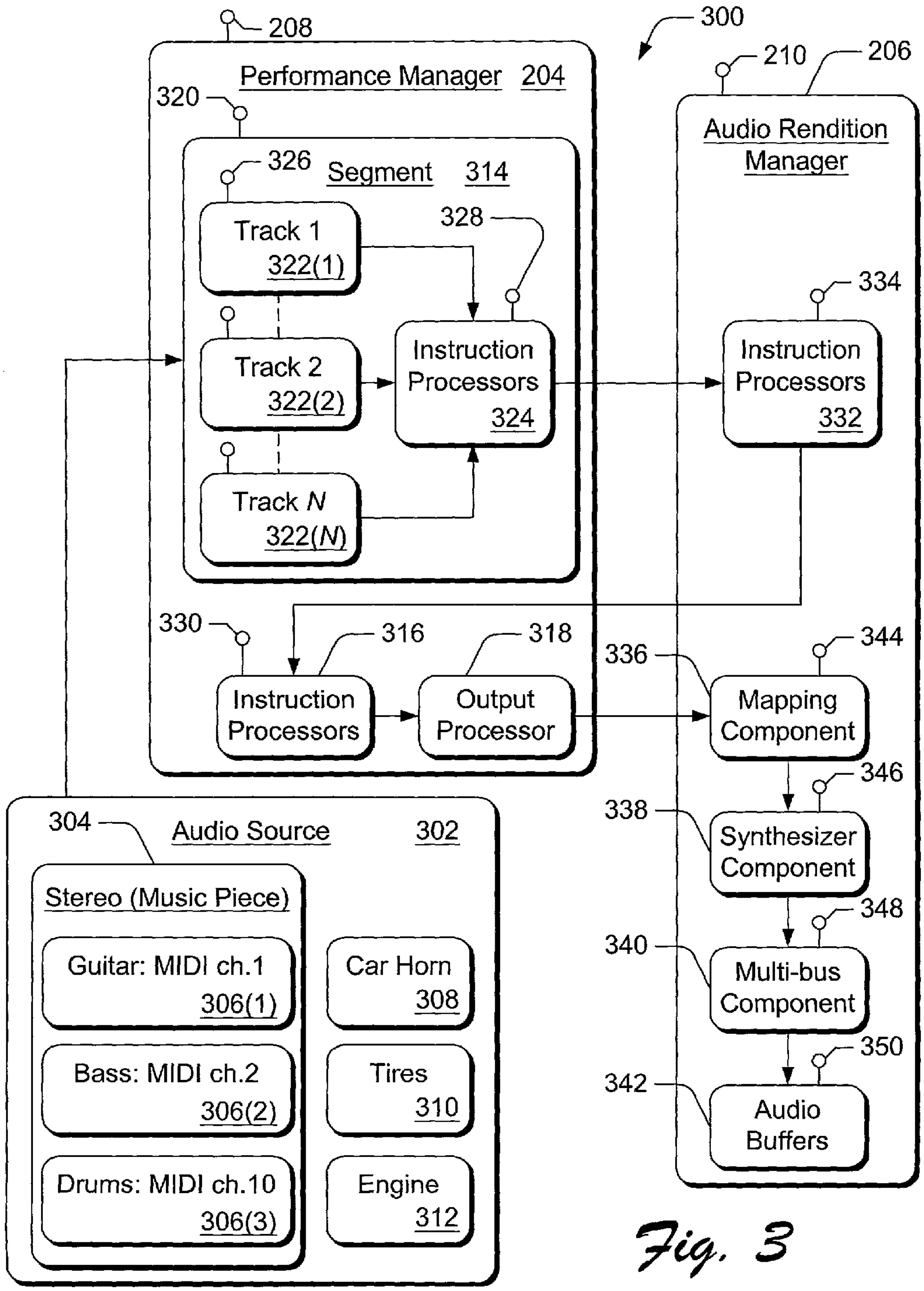
FIG. 3 illustrates various components of the audio generation system shown in FIG. 2.

FIG. 3 illustrates a performance manager 204 and an audio rendition manager 206 as part of an audio generation system 300. An audio source 302 provides sound effects for an audio representation of various sounds that a driver of a car might hear in a video game, for example. The various sound effects can be presented to enhance the perspective of a person sitting in the car for an interactive video and audio presentation.

The audio source 302 has a MIDI formatted music piece 304 that represents the audio of a car stereo. The MIDI input 304 has sound effect instructions 306(1–3) to generate musical instrument sounds. Instruction 306(1) designates that a guitar sound be generated on MIDI channel one (1) in a synthesizer component, instruction 306(2) designates that a bass sound be generated on MIDI channel two (2), and instruction 306(3) designates that drums be generated on MIDI channel ten (10). Input audio source 302 also has digital audio sample inputs that represent a car horn sound effect 308, a tires sound effect 310, and an engine sound effect 312.

The performance manager 204 can receive audio content from a wave file (i.e., .wav file), a MIDI file, or a segment file authored with an audio production application, such as DirectMusic® Producer, for example. DirectMusic® Producer is an authoring tool for creating interactive audio content and is available from Microsoft Corporation of Redmond, Washington. Additionally, performance manager 204 can receive audio content that is composed at run-time from different audio content components.

Performance manager 204 receives audio content input from input audio source 302 and produces audio instructions for input to the audio rendition manager 206. Performance manager 204 includes a segment component 314, an instruction processors component 316, and an output processor 318. The segment component 314 represents the audio content input from audio source 302. Although performance manager 204 is shown having only one segment 314, the performance manager can have a primary segment and any number of secondary segments. Multiple segments can be arranged concurrently and/or sequentially with performance manager 204.

Segment component 314 can be instantiated as a programming object having one or more interfaces 320 and associated interface methods. In the described embodiment, segment object 314 is an instantiation of a COM object class and represents an audio or musical piece. An audio segment represents a linear interval of audio data or a music piece and is derived from the inputs of an audio source which can be digital audio data, such as the engine sound effect 312 in audio source 302, or event-based data, such as the MIDI formatted input 304.

Segment component 314 has track components 322(1) through 322(N), and an instruction processors component 324. Segment 314 can have any number of track components 322 and can combine different types of audio data in the segment with different track components. Each type of audio data corresponding to a particular segment is contained in a track component 322 in the segment, and an audio segment is generated from a combination of the tracks in the segment. Thus, segment 314 has a track 322 for each of the audio inputs from audio source 302.

Each segment object contains references to one or a plurality of track objects. Track components 322(1) through 322(N) can be instantiated as programming objects having one or more interfaces 326 and associated interface methods. The track objects 322 are played together to render the audio and/or musical piece represented by segment object 314 which is part of a larger overall performance. When first instantiated, a track object does not contain actual music or audio performance data, such as a MIDI instruction sequence. However, each track object has a stream input/output (I/O) interface method through which audio data is specified.

The track objects 322(1) through 322(N) generate event instructions for audio and music generation components when performance manager 204 plays the segment 314. Audio data is routed through the components in the performance manager 204 in the form of event instructions which contain information about the timing and routing of the audio data. The event instructions are routed between and through the components in performance manager 204 on designated performance channels. The performance channels are allocated as needed to accommodate any number of audio input sources and to route event instructions.

To play a particular audio or musical piece, performance manager 204 calls segment object 314 and specifies a time interval or duration within the musical segment. The segment object in turn calls the track play methods of each of its track objects 322, specifying the same time interval. The track objects 322 respond by independently rendering event instructions at the specified interval. This is repeated, designating subsequent intervals, until the segment has finished its playback over the specified duration.

The event instructions generated by a track 322 in segment 314 are input to the instruction processors component 324 in the segment. The instruction processors component 324 can be instantiated as a programming object having one or more interfaces 328 and associated interface methods. The instruction processors component 324 has any number of individual event instruction processors (not shown) and represents the concept of a "graph" that specifies the logical relationship of an individual event instruction processor to another in the instruction processors component. An instruction processor can modify an event instruction and pass it on, delete it, or send a new instruction.

The instruction processors component 316 in performance manager 204 also processes, or modifies, the event instructions. The instruction processors component 316 can be instantiated as a programming object having one or more interfaces 330 and associated interface methods. The event instructions are routed from the performance manager instruction processors component 316 to the output processor 318 which converts the event instructions to MIDI formatted audio instructions. The audio instructions are then routed to audio rendition manager 206.

The audio rendition manager 206 processes audio data to produce one or more instances of a rendition corresponding to an audio source, or audio sources. That is, audio content from multiple sources can be processed and played on a single audio rendition manager 206 simultaneously. Rather than allocating buffer and hardware audio channels for each sound, an audio rendition manager 206 can be instantiated, or otherwise defined, to process multiple sounds from multiple sources.

For example, a rendition of the sound effects in audio source 302 can be processed with a single audio rendition manager 206 to produce an audio representation from a spatialization perspective of inside a car. Additionally, the audio rendition manager 206 dynamically allocates hardware channels (e.g., audio buffers to stream the audio wave data) as needed and can render more than one sound through a single hardware channel because multiple audio events are pre-mixed before being rendered via a hardware channel.

The audio rendition manager 206 has an instruction processors component 332 that receives event instructions from the output of the instruction processors component 324 in segment 314 in the performance manager 204. The instruction processors component 332 in audio rendition manager 206 is also a graph of individual event instruction modifiers that process event instructions. Although not shown, the instruction processors component 332 can receive event instructions from any number of segment outputs. Additionally, the instruction processors component 332 can be instantiated as a programming object having one or more interfaces 334 and associated interface methods.

The audio rendition manager 206 also includes several component objects that are logically related to process the audio instructions received from output processor 318 of performance manager 204. The audio rendition manager 206 has a mapping component 336, a synthesizer component 338, a multi-bus component 340, and an audio buffers component 342.

Mapping component 336 can be instantiated as a programming object having one or more interfaces 344 and associated interface methods. The mapping component 336 maps the audio instructions received from output processor 318 in the performance manager 204 to synthesizer component 338. Although not shown, an audio rendition manager can have more than one synthesizer component. The mapping component 336 communicates audio instructions from multiple sources (e.g., multiple performance channel outputs from output processor 318) for input to one or more synthesizer components 338 in the audio rendition manager 206.

The synthesizer component 338 can be instantiated as a programming object having one or more interfaces 346 and associated interface methods. Synthesizer component 338 receives the audio instructions from output processor 318 via the mapping component 336. Synthesizer component 338 generates audio sound wave data from stored wavetable data in accordance with the received MIDI formatted audio instructions. Audio instructions received by the audio rendition manager 206 that are already in the form of audio wave data are mapped through to the synthesizer component 338, but are not synthesized.

A segment component that corresponds to audio content from a wave file is played by the performance manager 204 like any other segment. The audio data from a wave file is routed through the components of the performance manager on designated performance channels and is routed to the audio rendition manager 206 along with the MIDI formatted audio instructions. Although the audio content from a wave file is not synthesized, it is routed through the synthesizer component 338 and can be processed by MIDI controllers in the synthesizer.

The multi-bus component 340 can be instantiated as a programming object having one or more interfaces 348 and associated interface methods. The multi-bus component 340 routes the audio wave data from the synthesizer component 338 to the audio buffers component 342. The multi-bus component 340 is implemented to represent actual studio audio mixing. In a studio, various audio sources such as instruments, vocals, and the like (which can also be outputs of a synthesizer) are input to a multi-channel mixing board that then routes the audio through various effects (e.g., audio processors), and then mixes the audio into the two channels that are a stereo signal.

The audio buffers component 342 is an audio data buffers manager that can be instantiated or otherwise provided as a programming object or objects having one or more interfaces 350 and associated interface methods. The audio buffers component 342 receives the audio wave data from synthesizer component 338 via the multi-bus component 340. Individual audio buffers, such as a hardware audio channel or a software representation of an audio channel, in the audio buffers component 342 receive the audio wave data and stream the audio wave data in real-time to an audio rendering device, such as a sound card, that produces an audio rendition represented by the audio rendition manager 206 as audible sound.

The various component configurations described herein support COM interfaces for reading and loading the configuration data from a file. To instantiate the components, an application program or a script file instantiates a component using a COM function. The components of the audio generation systems described herein are implemented with COM technology and each component corresponds to an object class and has a corresponding object type identifier or CLSID (class identifier). A component object is an instance of a class and the instance is created from a CLSID using a COM function called CoCreateInstance. However, those skilled in the art will recognize that the audio generation systems and the various components described herein are not limited to a COM implementation, or to any other specific programming technique.

Exemplary Audio Rendition Components

Figure 4:
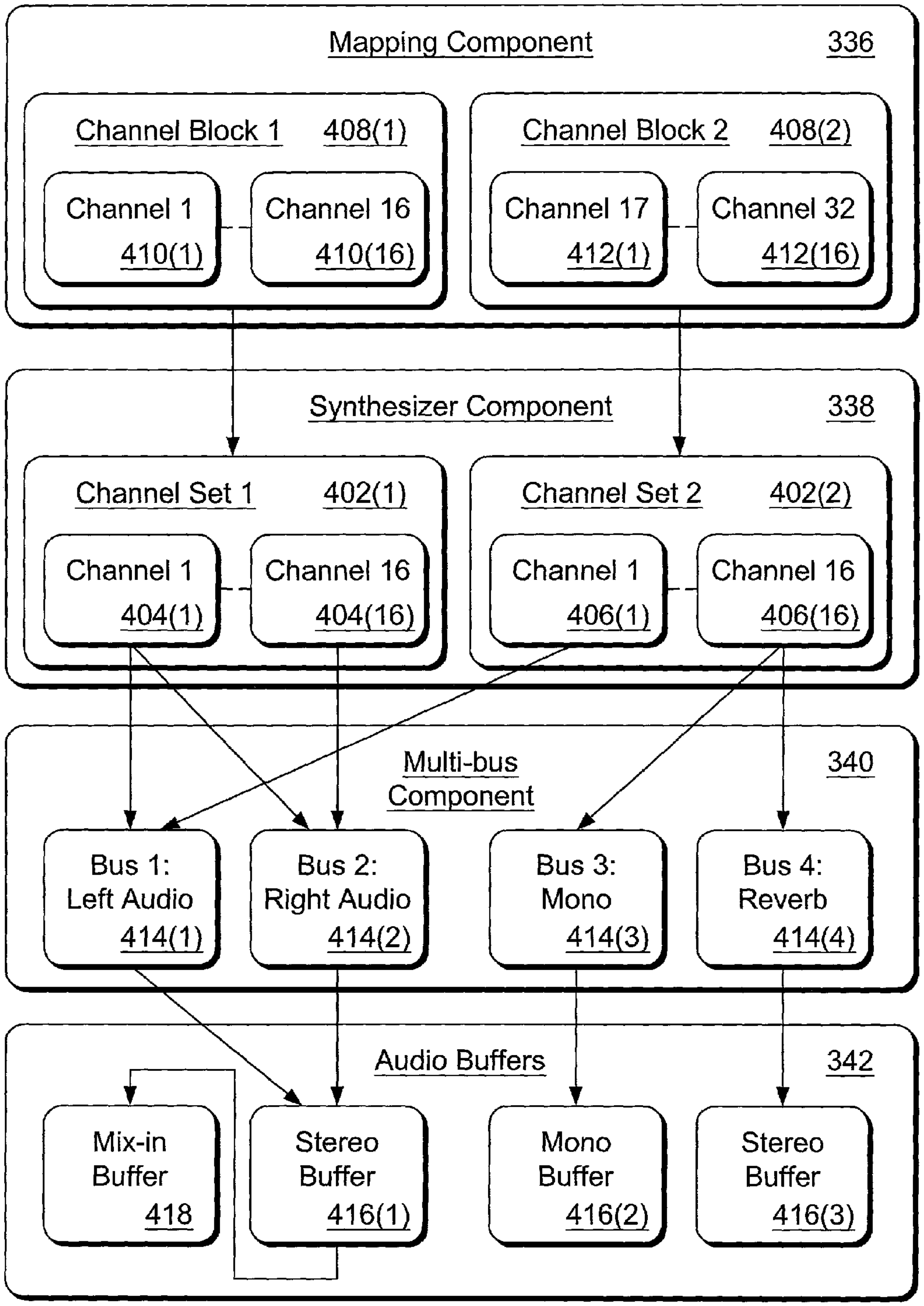
FIG. 4 illustrates various components of the audio generation system shown in FIG. 3.

FIG. 4 illustrates various audio data processing components of the audio rendition manager 206 in accordance with an implementation of the audio generation systems described herein. Details of the mapping component 336, synthesizer component 338, multi-bus component 340, and the audio buffers component 342 (FIG. 3) are illustrated, as well as a logical flow of audio data instructions through the components.

Synthesizer component 338 has two channel sets 402(1) and 402(2), each having sixteen MIDI channels 404(1–16) and 406(1–16), respectively. Those skilled in the art will recognize that a group of sixteen MIDI channels can be identified as channels zero through fifteen (0–15). For consistency and explanation clarity, groups of sixteen MIDI channels described herein are designated in logical groups of one through sixteen (1–16). A synthesizer channel is a communications path in synthesizer component 338 represented by a channel object. A channel object has APIs and associated interface methods to receive and process MIDI formatted audio instructions to generate audio wave data that is output by the synthesizer channels.

To support the MIDI standard, and at the same time make more MIDI channels available in a synthesizer to receive MIDI inputs, channel sets are dynamically created as needed. As many as 65,536 channel sets, each containing sixteen channels, can be created and can exist at any one time for a total of over one million available channels in a synthesizer component. The MIDI channels are also dynamically allocated in one or more synthesizers to receive multiple audio instruction inputs. The multiple inputs can then be processed at the same time without channel overlapping and without channel clashing. For example, two MIDI input sources can have MIDI channel designations that designate the same MIDI channel, or channels. When audio instructions from one or more sources designate the same MIDI channel, or channels, the audio instructions are routed to a synthesizer channel 404 or 406 in different channel sets 402(1) or 402(2), respectively.

Mapping component 336 has two channel blocks 408(1) and 408(2), each having sixteen mapping channels to receive audio instructions from output processor 318 in the performance manager 204. The first channel block 408(1) has sixteen mapping channels 410(1–16) and the second channel block 408(2) has sixteen mapping channels 412 (1–16). The channel blocks 408 are dynamically created as needed to receive the audio instructions. The channel blocks 408 each have sixteen channels to support the MIDI standard and the mapping channels are identified sequentially. For example, the first channel block 408(1) has mapping channels one through sixteen (1–16) and the second channel block 408(2) has mapping channels seventeen through thirty-two (17–32). A subsequent third channel block would have sixteen channels thirty-three through forty-eight (33–48).

Each channel block 408 corresponds to a synthesizer channel set 402, and each mapping channel in a channel block maps directly to a synthesizer channel in a synthesizer channel set. For example, the first channel block 408(1) corresponds to the first channel set 402(1) in synthesizer component 338. Each mapping channel 410(1–16) in the first channel block 408(1) corresponds to each of the sixteen synthesizer channels 404(1–16) in channel set 402(1). Additionally, channel block 408(2) corresponds to the second channel set 402(2) in synthesizer component 338. A third channel block can be created in mapping component 336 to correspond to a first channel set in a second synthesizer component (not shown).

Mapping component 336 allows multiple audio instruction sources to share available synthesizer channels, and dynamically allocating synthesizer channels allows multiple source inputs at any one time. Mapping component 336 receives the audio instructions from output processor 318 in the performance manager 204 so as to conserve system resources such that synthesizer channel sets are allocated only as needed. For example, mapping component 336 can receive a first set of audio instructions on mapping channels 410 in the first channel block 408 that designate MIDI channels one (1), two (2), and four (4) which are then routed to synthesizer channels 404(1), 404(2), and 404(4), respectively, in the first channel set 402(1).

When mapping component 336 receives a second set of audio instructions that designate MIDI channels one (1), two (2), three (3), and ten (10), the mapping component routes the audio instructions to synthesizer channels 404 in the first channel set 402(1) that are not currently in use, and then to synthesizer channels 406 in the second channel set 402(2). For example, the audio instruction that designates MIDI channel one (1) is routed to synthesizer channel 406(1) in the second channel set 402(2) because the first MIDI channel 404(1) in the first channel set 402(1) already has an input from the first set of audio instructions. Similarly, the audio instruction that designates MIDI channel two (2) is routed to synthesizer channel 406(2) in the second channel set 402(2) because the second MIDI channel 404(2) in the first channel set 402(1) already has an input. The mapping component 336 routes the audio instruction that designates MIDI channel three (3) to synthesizer channel 404(3) in the first channel set 402(1) because the channel is available and not currently in use. Similarly, the audio instruction that designates MIDI channel ten (10) is routed to synthesizer channel 404(10) in the first channel set 402(1).

When particular synthesizer channels are no longer needed to receive MIDI inputs, the resources allocated to create the synthesizer channels are released as well as the resources allocated to create the channel set containing the synthesizer channels. Similarly, when unused synthesizer channels are released, the resources allocated to create the channel block corresponding to the synthesizer channel set are released to conserve resources.

Multi-bus component 340 has multiple logical buses 414(1–4). A logical bus 414 is a logic connection or data communication path for audio wave data received from synthesizer component 338. The logical buses 414 receive audio wave data from the synthesizer channels 404 and 406 and route the audio wave data to the audio buffers component 342. Although the multi-bus component 340 is shown having only four logical buses 414(1–4), it is to be appreciated that the logical buses are dynamically allocated as needed, and released when no longer needed. Thus, the multi-bus component 340 can support any number of logical buses at any one time as needed to route audio wave data from synthesizer component 338 to the audio buffers component 342.

The audio buffers component 342 includes three buffers 416(1–3) that receive the audio wave data output by synthesizer component 338. The buffers 416 receive the audio wave data via the logical buses 414 in the multi-bus component 340. An audio buffer 416 receives an input of audio wave data from one or more logical buses 414, and streams the audio wave data in real-time to a sound card or similar audio rendering device. An audio buffer 416 can also process the audio wave data input with various effects-processing (i.e., audio data processing) components before sending the data to be further processed and/or rendered as audible sound. The effects processing components are created as part of a buffer 416 and a buffer can have one or more effects processing components that perform functions such as control pan, volume, 3-D spatialization, reverberation, echo, and the like.

The audio buffers component 342 includes three types of buffers. The input buffers 416 receive the audio wave data output by the synthesizer component 338. A mix-in buffer 418 receives data from any of the other buffers, can apply effects processing, and mix the resulting wave forms. For example, mix-in buffer 418 receives an input from input buffer 416(1). Mix-in buffer 418, or mix-in buffers, can be used to apply global effects processing to one or more outputs from the input buffers 416. The outputs of the input buffers 416 and the output of the mix-in buffer 418 are input to a primary buffer (not shown) that performs a final mixing of all of the buffer outputs before sending the audio wave data to an audio rendering device.

The audio buffers component 342 includes a two channel stereo buffer 416(1) that receives audio wave data input from logic buses 414(1) and 414(2), a single channel mono buffer 416(2) that receives audio wave data input from logic bus 414(3), and a single channel reverb stereo buffer 416(3) that receives audio wave data input from logic bus 414(4). Each logical bus 414 has a corresponding bus function identifier that indicates the designated effects-processing function of the particular buffer 416 that receives the audio wave data output from the logical bus. For example, a bus function identifier can indicate that the audio wave data output of a corresponding logical bus will be to a buffer 416 that functions as a left audio channel such as from bus 414(1), a right audio channel such as from bus 414(2), a mono channel such as from bus 414(3), or a reverb channel such as from bus 414(4). Additionally, a logical bus can output audio wave data to a buffer that functions as a three-dimensional (3-D) audio channel, or output audio wave data to other types of effects-processing buffers.

A logical bus 414 can have more than one input, from more than one synthesizer, synthesizer channel, and/or audio source. Synthesizer component 338 can mix audio wave data by routing one output from a synthesizer channel 404 and 406 to any number of logical buses 414 in the multi-bus component 340. For example, bus 414(1) has multiple inputs from the first synthesizer channels 404(1) and 406(1) in each of the channel sets 402(1) and 402(2), respectively. Each logical bus 414 outputs audio wave data to one associated buffer 416, but a particular buffer can have more than one input from different logical buses. For example, buses 414(1) and 414(2) output audio wave data to one designated buffer. The designated buffer 416(1), however, receives the audio wave data output from both buses.

Although the audio buffers component 342 is shown having only three input buffers 416(1–3) and one mix-in buffer 418, it is to be appreciated that there can be any number of audio buffers dynamically allocated as needed to receive audio wave data at any one time. Furthermore, although the multi-bus component 340 is shown as an independent component, it can be integrated with the synthesizer component 338, or with the audio buffers component 342.

Exemplary Audio Generation System Buffers

Figure 5:
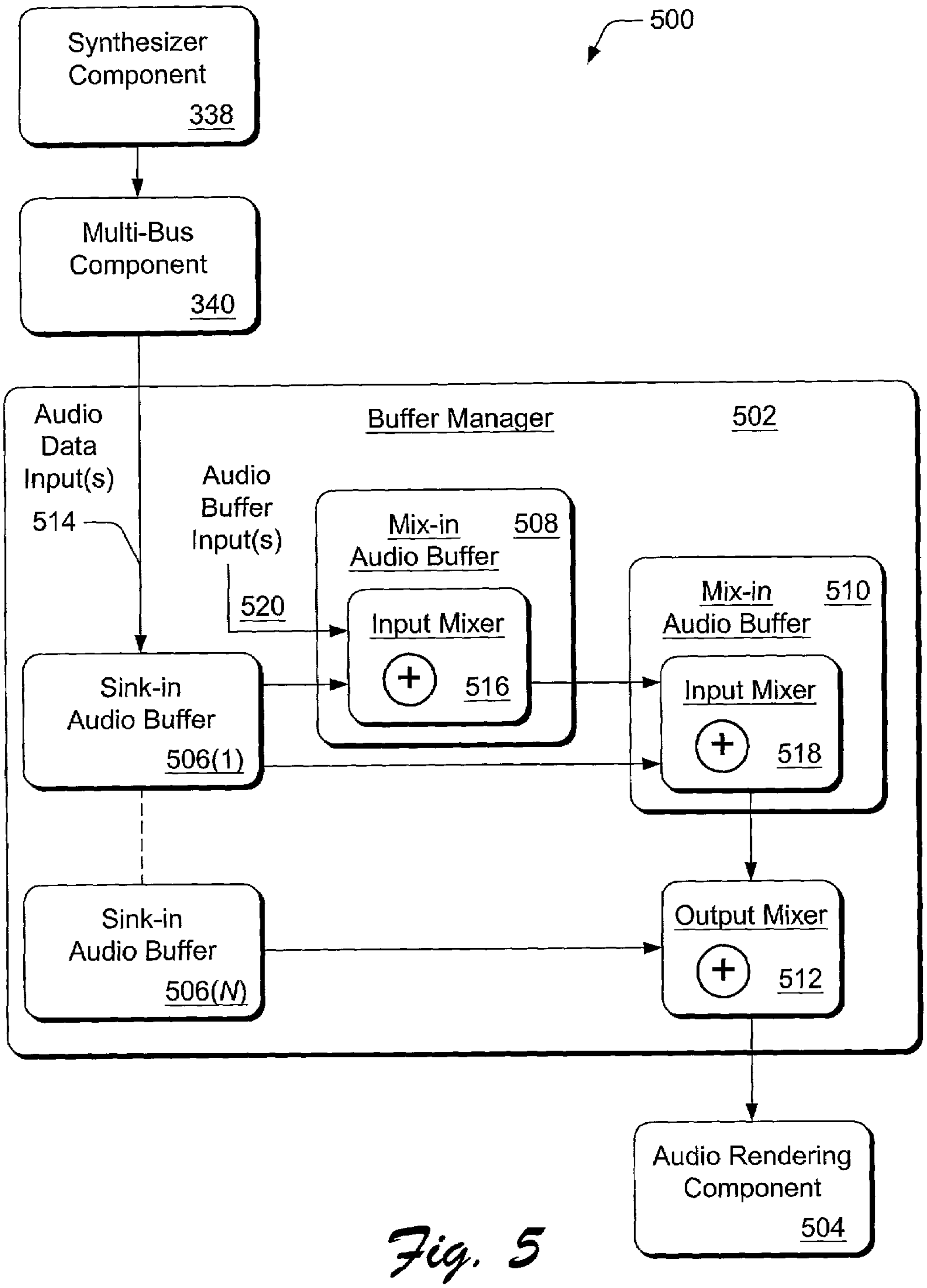
FIG. 5 illustrates an exemplary audio buffer system.

FIG. 5 illustrates an exemplary audio buffer system 500 that includes an audio buffer manager 502 and audio rendering component(s) 504. Buffer manager 502 includes multiple sink-in audio buffers 506(1) through 506(N), a first mix-in audio buffer 508, a second mix-in audio buffer 510, and an output mixer component 512. As used herein, an audio buffer is the software and/or hardware system resources reserved and implemented to communicate a stream of audio data from an audio source component or application program to audio rendering components of a computing system via audio output ports of the computing system.

Sink-in audio buffers 506(1) through 506(N) receive one or more streams of audio data input(s) 514 from an audio source component such as synthesizer component 338 via logical buses of the multi-bus component 340. Although not shown, sink-in audio buffers 506 can also receive streams of audio data from another audio buffer, a file, and/or an audio data resource. An audio source component can be any component that generates audio segments, such as a DirectMusic® component, a software synthesizer, or an audio file decoder. Sink-in audio buffers 506 can be implemented as looping audio buffers that will continue to request and communicate streams of audio data until stopped by a control component, such as a buffer manager or an application program. A conventional static, or non-looping, audio buffer plays an audio source once and stops automatically.

Mix-in audio buffers 508 and 510 each include an input mixer component 516 and 518, respectively, which receives streams of audio data from multiple sending audio buffers at one time and combines the streams of audio data into a single stream of combined audio data prior to further processing. The mix-in audio buffers 508 and 510 receive streams of audio data from one or more sink-in audio buffers and/or from other mix-in audio buffers. For example, mix-in audio buffer 508 receives a stream of audio data from sink-in audio buffer 506(1) and receives one or more inputs 520 at input mixer 516. Mix-in audio buffer 508 generates a stream of combined audio data that includes the streams of audio data received from the one or more inputs 520 and from sink-in audio buffer 506(1). Further, mix-in audio buffer 510 also receives a stream of audio data from sink-in audio buffer 506(1) and from mix-in audio buffer 508. Mix-in audio buffer 510 generates a stream of combined audio data that includes the streams of audio data received from sink-in audio buffer 506(1) and from mix-in audio buffer 508.

Sink-in audio buffer 506(N) outputs and communicates a stream of audio data to output mixer 512, and mix-in audio buffer 518 outputs and communicates a stream of combined audio data to output mixer 512. Output mixer 512 can be implemented as a primary audio buffer that maintains, mixes, and streams the audio that a listener will hear when an audio rendering component 504 produces an audio rendition of the corresponding audio data. The sink-in audio buffers 506(1) through 506(N), and the mix-in audio buffers 508 and 510, can be implemented as secondary audio buffers that route streams of audio data to the output mixer 512. The output mixer 512 streams the audio sound waves for input to an audio rendering component 504. Audio corresponding to different audio buffers can be mixed by playing the different audio buffers at the same time, and any number of audio buffers can be played at one time.

Mix-in audio buffers 508 and 510 serve as intermediate mixing locations for multiple audio buffers, prior to a final mix of all the audio buffer outputs together in the output mixer 512. The mix-in audio buffers improve computing system CPU (central processing unit) efficiency by mixing and processing the audio data in intermediate stages.

In response to an application program request, such as a multimedia game program, buffer manager 502 creates mix-in audio buffers 508 and 510, and the sink-in audio buffers 506. Further, buffer manager 502 requests streams of audio data from the audio data source for input to the sink-in audio buffers 506. Buffer manager 502 coordinates the availability of the sink-in audio buffers 506(1) through 506(N) to receive audio data input(s) 514 from synthesizer component 338. As described herein, creating or otherwise defining an audio buffer describes reserving various hardware and/or software resources to implement an audio buffer. Further, the audio buffers can be instantiated as programming objects each having an interface that is callable by the buffer manager and/or by an application program. An audio buffer object represents an audio buffer containing sound data, or audio data, and the buffer object can be referenced to start, stop, and pause sound playback, as well as to set attributes such as frequency and format of the sound.

Playing an audio buffer that is instantiated as a programming object includes executing an API method to initiate sound transmission on the audio buffer, which may include reading and processing data from the buffer's audio source. Although not shown, audio buffer manager 500 can also include static buffers that are created and managed within buffer manager 500 along with the sink-in audio buffers and the mix-in audio buffers. The static buffers are typically written to once and then played, whereas the sink-in audio buffers and mix-in audio buffers are streaming audio buffers that are continually provided with audio data while they are playing.

Buffer manager 502 creates and deactivates the sink-in audio buffers 506 and the mix-in audio buffers 508 and 510 according to creation and deletion ordering rules because the audio buffers are dynamically created and removed from the buffer architecture while audio for an application program is playing. A mix-in audio buffer is defined before the one or more buffers that input audio data to the mix-in audio buffer are defined. For example, mix-in audio buffer 510 in buffer manager 502 is defined before mix-in audio buffer 508 and before sink-in audio buffer 506(1), both of which input audio data to mix-in audio buffer 510. Similarly, mix-in audio buffer 508 is defined before sink-in audio buffer 506(1) which inputs audio data to mix-in audio buffer 508. When the audio buffers are deactivated, the computing system resources reserved for the audio buffers are released in a reverse order. For example, sink-in audio buffer 506(1) is deactivated before mix-in audio buffer 508, and mix-in audio buffer is deactivated before mix-in audio buffer 510.

A digital sample of an audio source stored in a wave file (i.e., a .wav file) can be played through audio buffers in buffer manager 502 without audio processing the wave sound in an audio rendition manager by playing the wave sound directly to audio buffers. However, the features of the audio generation systems described herein allow that a wave sound can be loaded as a segment and played through a performance manager as part of an overall performance. Playing a wave sound through a performance manager provides a tighter integration of sound effects and music, and provides greater audio processing functionality such as the ability to mix sounds on an AudioPath (i.e., audio rendition manager) before the sounds are input to an audio buffer.

Exemplary Audio Buffers with Audio Effects

Figure 6:
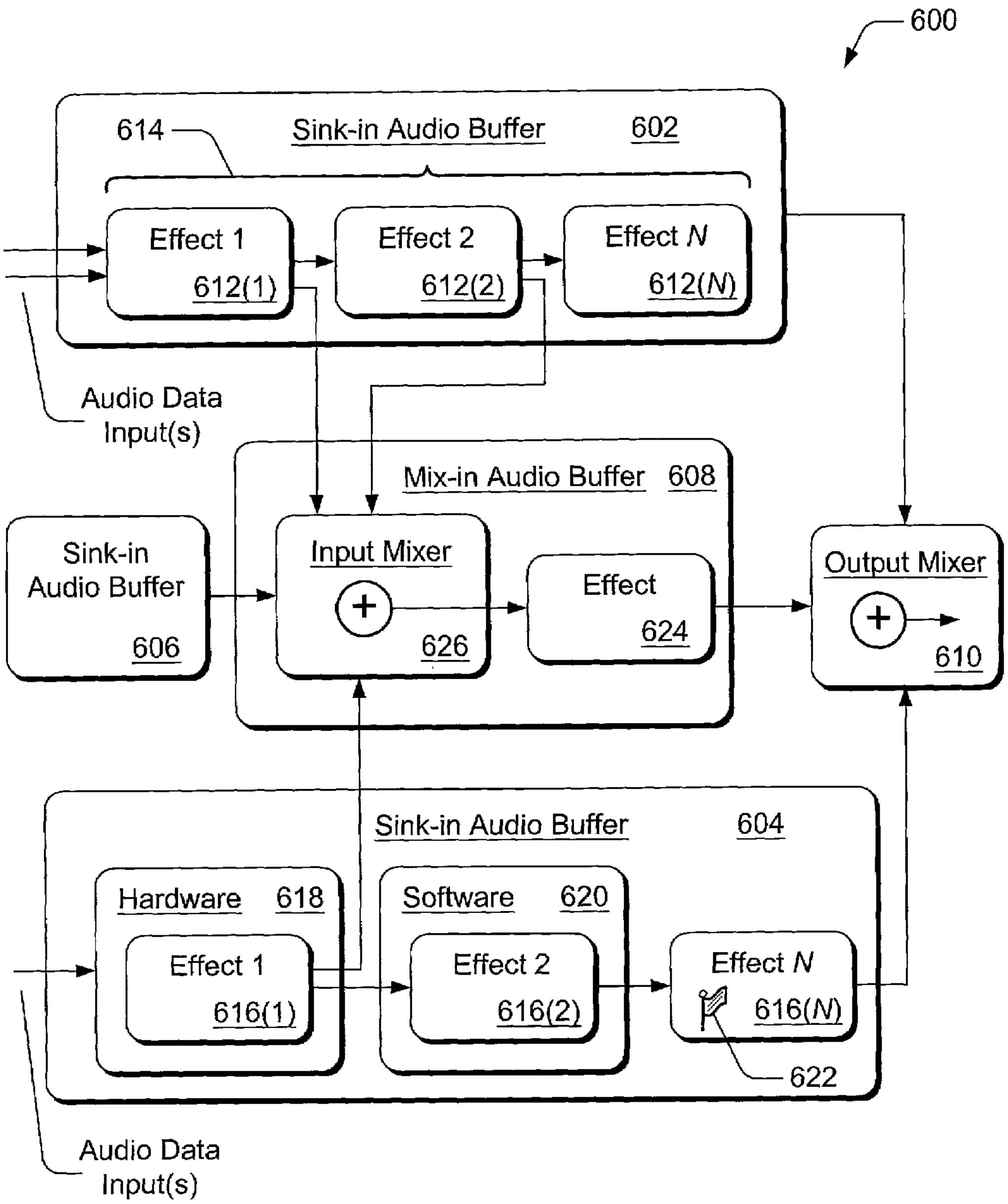
FIG. 6 illustrates exemplary audio buffers with audio effects.

FIG. 6 illustrates an exemplary audio buffer system 600 that includes sink-in audio buffers 602, 604, and 606, a mix-in audio buffer 608, and an output mixer component 610. The various components of exemplary audio buffer system 600 can each be implemented as a component of the audio buffer system 500 (FIG. 5) in the buffer manager 502. The sink-in audio buffers 602 and 604, and the mix-in audio buffer 608, each include one or more audio effects that are software or hardware components implemented as part of an audio buffer to modify sound (i.e., audio data).

Sink-in audio buffer 602 includes audio effects 612(1) through 612(N) which form an effects chain 614. An audio effect modifies audio data that is input as a stream of audio data to an audio buffer. Sink-in audio buffer 602 receives audio data input(s) and each audio effect 612 in effects chain 614 modifies the audio data accordingly and communicates the stream of modified audio data to the next audio effect. Audio effect 612(2) receives modified audio data from audio effect 612(1) and further modifies the audio data. Similarly, audio effect 612(N) receives modified audio data from audio effect 612(2) and further modifies the audio data to generate a stream of modified audio data. It is to be appreciated that an audio buffer can include any number of audio effects of varying configuration.

An audio effect can be implemented as any number of sound modifying effects which are described following. A chorus effect is a voice-doubling sound effect created by echoing the original sound with a slight delay and modulating the delay of the echo. A compression effect reduces the fluctuation of an audio signal above a certain amplitude. A distortion effect achieves distortion by adding harmonics to an audio signal such that the top of the waveform becomes squared off or clipped as the level increases. An echo effect causes an audio sound to be repeated after a fixed-time delay.

An environmental reverberation effect is a sound effect in accordance with the Interactive 3-D Audio, Level 2 (I3DL2) specification, published by the Interactive Audio Special Interest Group. Sounds reaching a listener have three temporal components: a direct path, early reflections, and late reverberation. Direct path is an audio signal that travels straight from the sound source to the listener, without bouncing or reflecting off of any surface. Early reflections are audio signals that reach the listener after one or two reflections off of surfaces such as walls, a floor, and/or a ceiling. Late reverberation, or simply reverb, is a combination of lower-order reflections and a dense succession of echoes having diminishing intensity.

A flange effect is an echo effect in which the delay between the original audio signal and its echo is very short and varies over time, resulting in a sweeping sound. A gargle effect is a sound effect that modulates the amplitude of an audio signal. A parametric equalizer effect is a sound effect that amplifies or attenuates Signals of a given frequency. Parametric equalizer effects for different pitches can be applied in parallel by setting multiple instances of the parametric equalizer effect on the same buffer. A waves reverberation effect is a reverb effect.

An audio effect can be instantiated as a programming object having a particular association with an audio buffer, and having an interface that is callable by a software component, such as a component of an application program, or by an associated audio buffer component object. An audio effect that is instantiated as a programming object, which is a representation of the audio effect, can implement software resources to modify audio data received from an audio data input, or the programming object can manage hardware resources to modify the audio data.

Sink-in audio buffer 604 includes audio effects 616(1) through 616(N) that modify audio data received in audio data input(s) from audio data source(s). Audio effect 616(1) is implemented with hardware resources 618, and audio effect 616(2) is implemented with software resources 620. An audio effect is processed by a sound device of a computing system when the audio effect is implemented with hardware resources, and an audio effect is processed by software running in the computing system when the audio effect is implemented with software resources.

Audio effects implemented with hardware resources appear as software audio effects to the computing system, and are referred to as "proxy software effects". The proxy software effects route received control messages and settings directly to the hardware resources that implement the audio effect, either by means of an interface method, or by means of a driver-specific mechanism that interfaces the proxy effect and the hardware resources. Audio effects are implemented with hardware resources because different computing systems may not be able to effects process audio data due to the many varieties of processor speeds, sound card configurations, and the like. Sink-in audio buffer 604 includes an audio effects chain of audio effects 616 that share processing of audio data between both software and hardware resources. Audio effect 616(1) is implemented with hardware resources 618 and routes modified audio data to audio effect 616(2) which is implemented with software resources 620.

Audio effect 616(N) in sink-in audio buffer 604 includes a component identifier 622 that is a configuration flag to indicate how audio effect 616(N) is implemented when defined. Configuration flag 622 can indicate that audio effect 616(N) be implemented with hardware resources, with software resources, or in an optional configuration. The configuration flag 622 for audio effect 616(N) can indicate that the audio effect be implemented in hardware only, if hardware resources are available. If the hardware resources are not available, audio effect 616(N) is not implemented (even if software resources are available). The configuration flag 622 can also indicate that the audio effect be implemented in software only, and if the software resources are not available, audio effect 616(N) is not implemented (even if hardware resources are available).

If system resources are not available to implement an audio effect, then the associated audio buffer is also not created because the audio buffer will be unable to process, or modify, the received audio data as requested. To avoid having an audio buffer not created altogether because system resources are not available to implement an audio effect in the audio buffer, the configuration flag 622 can indicate that the audio effect be implemented in hardware only, but with an option to create the associated audio buffer even if the system resources are not available to implement the audio effect. The audio buffer is created as if the request for hardware resources to implement the audio effect was not initiated.

Further, an audio effect can be implemented with available hardware resources that are subsequently requested by an application program or software component having a higher priority than the application program initially requesting the audio effect. If the hardware resources that implement an audio effect become unavailable, the configuration flag 622 can also indicate an optional fallback configuration such that audio effect 616(N) is implemented with software resources, if available.

Mix-in audio buffer 608 includes an audio effect 624 and an input mixer component 626. Input mixer 626 combines streams of audio data received from audio effects 612(1) and 612(2) in sink-in audio buffer 602 with streams of audio data received from audio effect 616(1) in sink-in audio buffer 604 and from sink-in audio buffer 606 to generate a stream of combined audio data. The output of input mixer 626 is routed to audio effect 624 which modifies the combined audio data. The inputs to input mixer 626 in mix-in audio buffer 608 illustrate that an audio effect in an audio buffer can also route a stream of modified audio data to a second audio buffer. For example, audio effects 612(1) and 612(2) in sink-in audio buffer 602, and audio effect 616(1) in sink-in audio buffer 604, each route a stream of modified audio data to mix-in audio buffer 608.

Output mixer 610 receives streams of modified audio data from sink-in audio buffers 602 and 604, and from mix-in audio buffer 608. The output mixer 610 combines the multiple streams of modified audio data and routes a combined stream of modified audio data to an audio rendering component that produces an audio rendition corresponding to the modified audio data.

File Format and Component Instantiation

Audio sources and audio generation systems can be pre-authored which makes it easy to develop complicated audio representations and generate music and sound effects without having to create and incorporate specific programming code for each instance of an audio rendition of a particular audio source. For example, audio rendition manager 206 (FIG. 3) and the associated audio data processing components can be instantiated from an audio rendition manager configuration data file (not shown).

A segment data file can also contain audio rendition manager configuration data within its file format representation to instantiate audio rendition manager 206. When a segment 414, for example, is loaded from a segment data file, the audio rendition manager 206 is created. Upon playback, the audio rendition manager 206 defined by the configuration data is automatically created and assigned to segment 414. When the audio corresponding to segment 414 is rendered, it releases the system resources allocated to instantiate audio rendition manager 206 and the associated components.

Configuration information for an audio rendition manager object, and the associated component objects for an audio generation system, is stored in a file format such as the Resource Interchange File Format (RIFF). A RIFF file includes a file header that contains data describing the object followed by what are known as "chunks." Each of the chunks following a file header corresponds to a data item that describes the object, and each chunk consists of a chunk header followed by actual chunk data. A chunk header specifies an object class identifier (CLSID) that can be used for creating an instance of the object. Chunk data consists of the data to define the corresponding data item. Those skilled in the art will recognize that an extensible markup language (XML) or other hierarchical file format can be used to implement the component objects and the audio generation systems described herein.

A RIFF file for a mapping component and a synthesizer component has configuration information that includes identifying the synthesizer technology designated by source input audio instructions. An audio source can be designed to play on more than one synthesis technology. For example, a hardware synthesizer can be designated by some audio instructions from a particular source, for performing certain musical instruments for example, while a wavetable synthesizer in software can be designated by the remaining audio instructions for the source.

The configuration information defines the synthesizer channels and includes both a synthesizer channel-to-buffer assignment list and a buffer configuration list stored in the synthesizer configuration data. The synthesizer channel-to-buffer assignment list defines the synthesizer channel sets and the buffers that are designated as the destination for audio wave data output from the synthesizer channels in the channel group. The assignment list associates buffers according to buffer global unique identifiers (GUIDs) which are defined in the buffer configuration list.

Defining the audio buffers by buffer GUIDs facilitates the synthesizer channel-to-buffer assignments to identify which audio buffer will receive audio wave data from a synthesizer channel. Defining audio buffers by buffer GUIDs also facilitates sharing resources such that more than one synthesizer can output audio wave data to the same buffer. When an audio buffer is instantiated for use by a first synthesizer, a second synthesizer can output audio wave data to the audio buffer if it is available to receive data input. The audio buffer configuration list also maintains flag indicators that indicate whether a particular audio buffer can be a shared resource or not.

The configuration information also includes a configuration list that contains the information to allocate and map audio instruction input channels to synthesizer channels. A particular RIFF file also has configuration information for a multi-bus component and an audio buffers component that includes data describing an audio buffer object in terms of a buffer GUID, a buffer descriptor, the buffer function and associated audio effects, and corresponding logical bus identifiers. The buffer GUID uniquely identifies each audio buffer and can be used to determine which synthesizer channels connect to which audio buffers. By using a unique audio buffer GUID for each buffer, different synthesizer channels, and channels from different synthesizers, can connect to the same buffer or uniquely different ones, whichever is preferred.

The instruction processors, mapping, synthesizer, multi-bus, and audio buffers component configurations support COM interfaces for reading and loading the configuration data from a file. To instantiate the components, an application program and/or a script file instantiates a component using a COM function. The components of the audio generation systems described herein can be implemented with COM technology and each component corresponds to an object class and has a corresponding object type identifier or CLSID (class identifier). A component object is an instance of a class and the instance is created from a CLSID using a COM function called CoCreateInstance. However, those skilled in the art will recognize that the audio generation systems and the various components described herein are not limited to a COM implementation, or to any other specific programming technique.

To create the component objects of an audio generation system, the application program calls a load method for an object and specifies a RIFF file stream. The object parses the RIFF file stream and extracts header information. When it reads individual chunks, it creates the object components, such as synthesizer channel group objects and corresponding synthesizer channel objects, and mapping channel blocks and corresponding mapping channel objects, based on the chunk header information.

Methods For Audio Buffer Systems

Although the audio generation and audio buffer systems have been described above primarily in terms of their components and their characteristics, the systems also include methods performed by a computer or similar device to implement the features described above.

Figure 7:
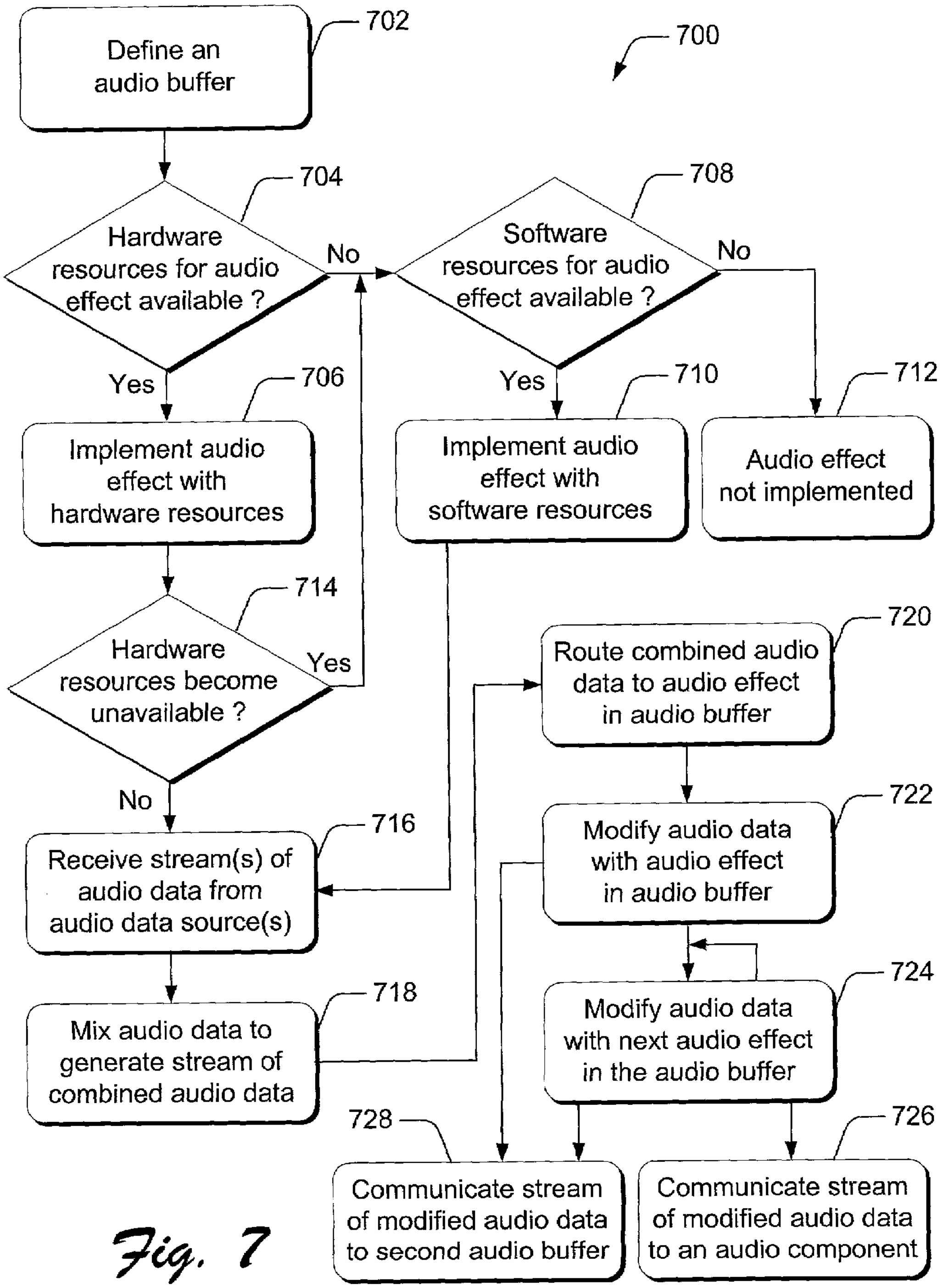
FIG. 7 is a flow diagram of a method for processing audio data in an audio buffer with one or more audio effects.

FIG. 7 illustrates a method 700 for processing audio data in an audio buffer with audio effects. The method is illustrated as a set of operations shown as discrete blocks, and the order in which the method is described is not intended to be construed as a limitation. Furthermore, the method can be implemented in any suitable hardware, software, firmware, or combination thereof.

At block 702, an audio buffer in an audio generation system is defined. For example, sink-in audio buffer 604 and mix-in audio buffer 608 (FIG. 6) are defined as components of an audio generation system. At block 704, it is determined whether system hardware resources are available to implement an audio effect in the audio buffer. If hardware resources are available to implement the audio effect (i.e., "yes" from block 704), the audio effect is implemented with the hardware resources at block 706. For example, audio effect 616(1) in sink-in audio buffer 604 is implemented with hardware resources 618. If hardware resources are not available to implement the audio effect (i.e., "no" from block 704), it is determined whether software resources are available to implement the audio effect in the audio buffer at block 708.

If software resources are available to implement the audio effect (i.e., "yes" from block 708), the audio effect is implemented with the software resources at block 710. For example, audio effect 616(2) in sink-in audio buffer 604 is implemented with software resources 620. If the software resources are not available to implement the audio effect (i.e., "no" from block 708), the audio effect is not implemented in the audio buffer at block 712. Determining whether the hardware and/or software resources are available to implement the audio effect can be based on a component identifier of the audio effect that indicates how the audio effect should be implemented if the resources are available. For example, audio effect 616(N) in sink-in audio buffer 604 has a flag 622 that is a component identifier to indicate whether audio effect 616(N) should be implemented with hardware or software resources if either is available.

Further, an audio effect can be instantiated as a programming object when implemented, and the programming object can have an interface that is callable by a software component, such as an audio buffer manager or a multimedia application program. When the audio effect is instantiated as a programming object, the programming object can implement software resources to modify audio data, or the programming object can manage hardware resources to modify the audio data.

After the audio effect is implemented with available hardware resources at block 706, it is determined at block 714 whether the hardware resources have become unavailable. If the hardware resources have become unavailable (i.e., "yes" from block 714, it is determined whether software resources are available to implement the audio effect at block 708. As described above, if the software resources are available, the audio effect is implemented at block 710, and if the software resources are not available, the audio effect is not implemented at block 712.

At block 716, one or more streams of audio data are received from one or more audio data sources. For example, sink-in audio buffer 604 receives audio data input(s) from an audio data source, and mix-in audio buffer 608 receives streams of audio data from audio effects 612(1) and 612(2) in sink-in audio buffer 602, from audio effect 616(1) in sink-in audio buffer 604, and from sink-in audio buffer 606.

At block 718, a stream of audio data received from an audio data source is mixed with a second stream of audio data received from a second audio data source to generate a stream of combined audio data. For example, input mixer 626 in mix-in audio buffer 608 combines the streams of audio data received from audio effects 612(1) and 612(2) in sink-in audio buffer 602 with the streams of audio data received from audio effect 616(1) in sink-in audio buffer 604 and from sink-in audio buffer 606.

At block 720, the stream of combined audio data is routed to the first audio effect in the audio buffer. For example, the output of input mixer 626 in mix-in audio buffer 608 is routed to audio effect 624 in the audio buffer. At block 722, the audio effect in the audio buffer modifies the audio data. For example, audio effect 624 in mix-in audio buffer 608 modifies the combined audio data. Similarly, for a sink-in audio buffer, audio effect 612(1) in sink-in audio buffer 602 modifies audio data received from the audio data input(s). Modifying the audio data includes digitally modifying the audio data with an audio effect.

At block 724, the audio data is modified with at least a second audio effect in the audio buffer. For example, audio effect 612(2) in sink-in audio buffer 602 receives modified audio data from audio effect 612(1) and further modifies the audio data. Similarly, audio effect 612(N) in sink-in audio buffer 602 receives modified audio data from audio effect 612(2) and further modifies the audio data to generate a stream of modified audio data. The process at block 724 continues throughout the audio effects chain 614 with each subsequent audio effect modifying the audio data.

At block 726, the stream of modified audio data is communicated to an audio component that produces an audio rendition corresponding to the stream of modified audio data. For example, streams of modified audio data (e.g., modified by the audio effects) are routed from sink-in audio buffers 602 and 604, and from mix-in audio buffer 608, to output mixer 610 which combines the multiple streams of modified audio data and routes a combined stream of modified audio data to an audio rendering component. Alternatively, or in addition, a stream of modified audio data from an audio buffer is communicated to at least a second audio buffer at block 728. For example, sink-in audio buffer 606 routes a stream of modified audio data to mix-in audio buffer 608. Further, an audio effect in an audio buffer can also route a stream of modified audio data to a second audio buffer at block 728 (from block 722). For example, audio effects 612(1) and 612(2) in sink-in audio buffer 602, and audio effect 616(1) in sink-in audio buffer 604, each route a stream of modified audio data to mix-in audio buffer 608.

Figure 8:
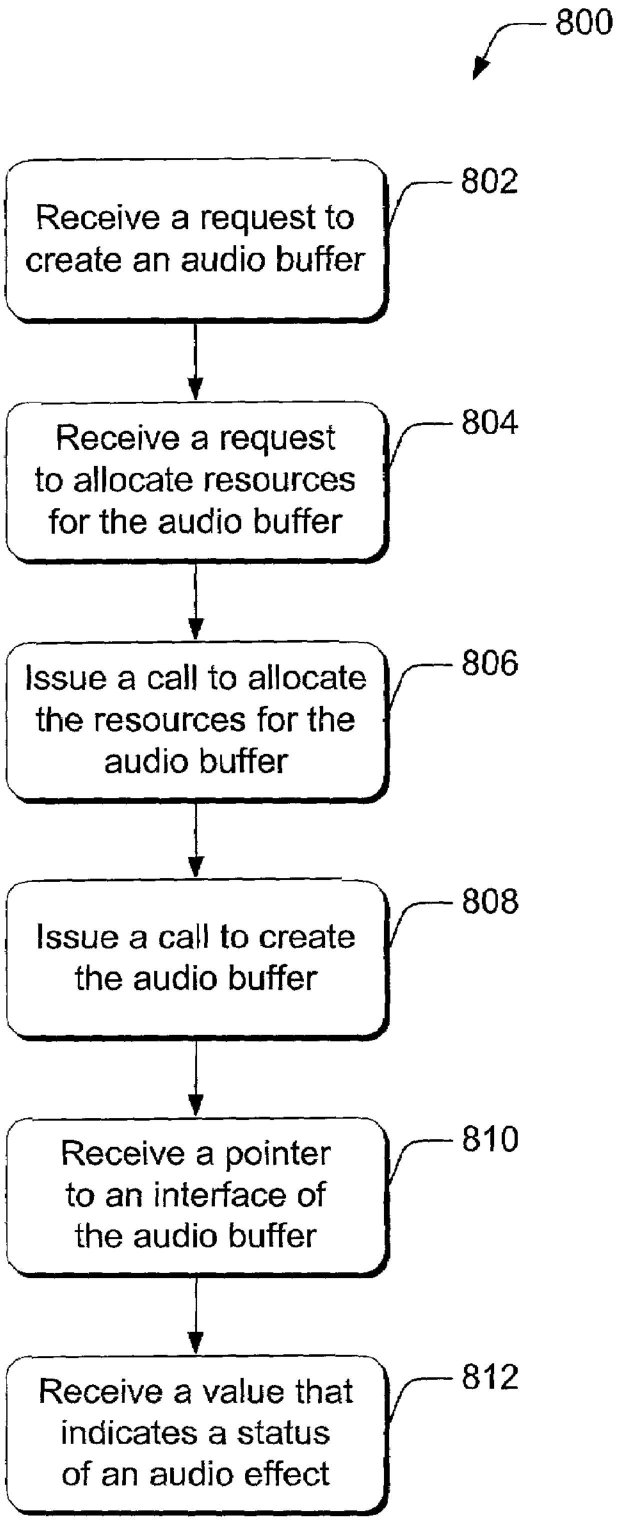
FIG. 8 is a flow diagram of a method for communicating between components of an audio generation system.

FIG. 8 illustrates a method 800 for communicating between components of an audio generation system. The method is illustrated as a set of operations shown as discrete blocks, and the order in which the method is described is not intended to be construed as a limitation. Furthermore, the method can be implemented in any suitable hardware, software, firmware, or combination thereof.

At block 802, a request is received to create an audio buffer having one or more audio effects. At block 804, a request is received to allocate resources to create the audio buffer. At block 806, a call is issued to allocate the resources to create the audio buffer. The call to allocate the resources includes parameters that specify the type of resources to be allocated, an address of an array of variables that each receive a status indicator that indicates the status of an audio effect associated with the audio buffer, and a value that indicates the number of variables in the array of variables.

At block 808, a call is issued to create the audio buffer. The call to create the audio buffer includes parameters that specify an address of an audio buffer description data structure, an address of a variable of an application program that receives an interface of the audio buffer, an address of an array of audio effect description data structures that describe one or more audio effect configurations, an address of an array of elements that each receive a value that indicates the result of an attempt to create a corresponding audio effect, and a value that indicates the number of audio effect description data structures and the number of elements.

At block 810, a pointer to an interface of the audio buffer is received. At block 812, a value is received that indicates the status of an audio effect associated with the audio buffer. The value can indicate that the audio effect is instantiated in hardware, is instantiated in software, can be instantiated in either hardware or software, was not created because resources were not available, was not created because another related audio effect could not be created, or is not registered for use by the audio generation system.

Audio Generation System Component Interfaces and Methods

Embodiments of the invention are described herein with emphasis on the functionality and interaction of the various components and objects. The following sections describe specific interfaces and interface methods that are supported by the various objects.

A Loader interface (IDirectMusicLoader8) is an object that gets other objects and loads audio rendition manager configuration information. It is generally one of the first objects created in a DirectX® audio application. DirectX® is an API available from Microsoft Corporation, Redmond Wash. The loader interface supports a LoadObjectFromFile method that is called to load all audio content, including DirectMusic® segment files, DLS (downloadable sounds) collections, MIDI files, and both mono and stereo wave files. It can also load data stored in resources. Component objects are loaded from a file or resource and incorporated into a performance. The Loader interface is used to manage the enumeration and loading of the objects, as well as to cache them so that they are not loaded more than once.

Audio Rendition Manager Interface and Methods

An AudioPath interface (IDirectMusicAudioPath8) represents the routing of audio data from a performance component to the various component objects that comprise an audio rendition manager. The AudioPath interface includes the following methods:

An Activate method is called to specify whether to activate or deactivate an audio rendition manager. The method accepts Boolean parameters that specify "TRUE" to activate, or "FALSE" to deactivate.

A ConvertPChannel method translates between an audio data channel in a segment component and the equivalent performance channel allocated in a performance manager for an audio rendition manager. The method accepts a value that specifies the audio data channel in the segment component, and an address of a variable that receives a designation of the performance channel.

A SetVolume method is called to set the audio volume on an audio rendition manager. The method accepts parameters that specify the attenuation level and a time over which the volume change takes place.

A GetObjectInPath method allows an application program to retrieve an interface for a component object in an audio rendition manager. The method accepts parameters that specify a performance channel to search, a representative location for the requested object in the logical path of the audio rendition manager, a CLSID (object class identifier), an index of the requested object within a list of matching objects, an identifier that specifies the requested interface of the object, and the address of a variable that receives a pointer to the requested interface.

The GetObjectInPath method is supported by various component objects of the audio generation system. The audio rendition manager, segment component, and audio buffers in the audio buffers component, for example, each support the getObject interface method that allows an application program to access and control the audio data processing component objects. The application program can get a pointer, or programming reference, to any interface (API) on any component object in the audio rendition manager while the audio data is being processed.

Real-time control of audio data processing components is needed, for example, to control an audio representation of a video game presentation when parameters that are influenced by interactivity with the video game change, such as a video entity's 3-D positioning in response to a change in a video game scene. Other examples include adjusting audio environment reverb in response to a change in a video game scene, or adjusting music transpose in response to a change in the emotional intensity of a video game scene.

Performance Manager Interface and Methods

A Performance interface (IDirectMusicPerformance8) represents a performance manager and the overall management of audio and music playback. The interface is used to add and remove synthesizers, map performance channels to synthesizers, play segments, dispatch event instructions and route them through event instructions, set audio parameters, and the like. The Performance interface includes the following methods:

A CreateAudioPath method is called to create an audio rendition manager object. The method accepts parameters that specify an address of an interface that represents the audio rendition manager configuration data, a Boolean value that specifies whether to activate the audio rendition manager when instantiated, and the address of a variable that receives an interface pointer for the audio rendition manager.

A CreateStandardAudioPath method allows an application program to instantiate predefined audio rendition managers rather than one defined in a source file. The method accepts parameters that specify the type of audio rendition manager to instantiate, the number of performance channels for audio data, a Boolean value that specifies whether to activate the audio rendition manager when instantiated, and the address of a variable that receives an interface pointer for the audio rendition manager.

A PlaySegmentEx method is called to play an instance of a segment on an audio rendition manager. The method accepts parameters that specify a particular segment to play, various flags, and an indication of when the segment instance should start playing. The flags indicate details about how the segment should relate to other segments and whether the segment should start immediately after the specified time or only on a specified type of time boundary.

The method returns a memory pointer to the state object that is subsequently instantiated as a result of calling PlaySegmentEx.

A StopEx method is called to stop the playback of audio on an component object in an audio generation system, such as a segment or an audio rendition manager. The method accepts parameters that specify a pointer to an interface of the object to stop, a time at which to stop the object, and various flags that indicate whether the segment should be stopped on a specified type of time boundary.

Segment Component Interface and Methods

A Segment interface (IDirectMusicSegment8) represents a segment in a performance manager which is comprised of multiple tracks. The Segment interface includes the following methods:

A Download method to download audio data to a performance manager or to an audio rendition manager. The term "download" indicates reading audio data from a source into memory. The method accepts a parameter that specifies a pointer to an interface of the performance manager or audio rendition manager that receives the audio data.

An Unload method to unload audio data from a performance manager or an audio rendition manager. The term "unload" indicates releasing audio data memory back to the system resources. The method accepts a parameter that specifies a pointer to an interface of the performance manager or audio rendition manager.

A GetAudioPathConfig method retrieves an object that represents audio rendition manager configuration data embedded in a segment. The object retrieved can be passed to the CreateAudioPath method described above. The method accepts a parameter that specifies the address of a variable that receives a pointer to the interface of the audio rendition manager configuration object.

Audio Buffer Interfaces and Methods

An IDirectSound8 interface has a CreateSoundBuffer method that returns a pointer to an IDirectSoundBuffer8 interface which an application uses to manipulate and play a buffer.

The CreateSoundBuffer method creates an audio buffer object to maintain a sequence of audio samples. The method accepts parameters that specify an address of a buffer description data structure that describes an audio buffer configuration (DSBufferDesc), an address of a variable that receives the IDirectSoundBuffer8 interface of the newly created audio buffer object (DSBuffer), and an address of the controlling object's IUnknown interface for COM aggregation.

A SetFX method implements one or more audio effects (or, "effects") for an audio buffer. The method accepts parameters that specify an address of an array of effect description data structures that describe audio effect configurations (DSFXDesc), an address of an array of elements that each receive a value (ResultCodes) to indicate the result of an attempt to create a corresponding effect in the array of effect description data structures, and a value which is the number (EffectsCount) of elements in the DSFXDesc array and in the ResultCodes array.

Each element receives one of the following values to indicate the result of creating the corresponding audio effect in the DSFXDesc array. A DSFXR_LOCHARDWARE value indicates that an audio effect is instantiated in hardware. A DSFXR_LOCSOFTWARE value indicates that an audio effect is instantiated in software. A DSFXR_UNALLOCATED value indicates that an audio effect is not assigned to hardware nor software. A DSFXR_FAILED value indicates that an audio effect was not created because resources were not available.

A DSFXR_PRESENT value indicates that resources to implement an audio effect are available, but that the audio effect was not created because another of the requested audio effects could not be created (If any of the requested audio effects cannot be created, none of the audio effects for a particular audio buffer are created and the call fails). A DSFXR_UNKNOWN value indicates that an audio effect is not registered for use by the audio generation system, and the method fails as a result.

An AcquireResources method allocates resources for an audio buffer that is created having a flag identifier (DSBCAPS_LOCDEFER) that indicates the audio buffer is not assigned to hardware or software until it is played. The flag identifier is located in the audio buffer's corresponding buffer description data structure (DSBufferDesc). The method accepts parameters that specify which type of resources (e.g., software, hardware) are to be allocated when the audio buffer is created, an address of an array of variables that each receive a information (ResultCodes) to indicate the status of the audio effects associated with the audio buffer, and a value which is the number (EffectsCount) of elements in the ResultCodes array. The ResultCodes array contains an element for each audio effect that is assigned to the audio buffer by the SetFX method.

For each audio effect, one of the following values is returned. A DSFXR_LOCHARDWARE value indicates that an audio effect is instantiated in hardware. A DSFXR_LOCSOFTWARE value indicates that an audio effect is instantiated in software. A DSFXR_FAILED value indicates that an audio effect was not created because resources were not available. A DSFXR_PRE SENT value indicates that resources to implement an audio effect are available, but that the audio effect was not created because another of the requested audio effects could not be created. A DSFXR_UKNOWN value indicates that an audio effect is not registered for use by the audio generation system, and the method fails as a result.

Audio Effect Objects and Methods

A Chorus effect is represented by a DirectSoundFXChorus8 object and is a voice-doubling effect created by echoing the original sound with a slight delay and modulating the delay of the echo. A Chorus object is obtained by calling GetObjectInPath on the audio buffer that supports the audio effect. The Chorus object interface includes a GetAllParameters method that retrieves the chorus parameters of an audio buffer, and includes a SetAllParameters method that sets the chorus parameters of the audio buffer. The Chorus effect includes parameters contained in a DSFXChorus structure for a chorus effect.

An Delay parameter identifies the amount of time, in milliseconds, that the input is delayed before it is played back. A default delay time is sixteen (16) milliseconds, however a minimum and a maximum delay time can be defined. A Depth parameter identifies the percentage by which the delay time is modulated by a low-frequency oscillator, in percentage points. A default depth is ten (10), however a minimum and a maximum depth can be defined. A Feedback parameter identifies the percentage of an output audio signal that is fed back into the audio effect input. A default feedback is twenty-five (25), however a minimum and a maximum feedback value can be defined.

A Frequency parameter identifies the frequency of the low-frequency oscillator. A default frequency is 1.1, however a minimum and a maximum frequency can be defined.

A WetDryMix parameter identifies the ratio of processed audio signal to unprocessed audio signal. A default parameter value is fifty (50), however a minimum and a maximum value can be defined. A Phase parameter identifies a phase differential between left and right low-frequency oscillators. A default phase value is ninety (90), however allowable phase values can be defined. A Waveform parameter identifies a waveform of the low-frequency oscillator, which is by default a sine wave.

A Compression effect is represented by a DirectSoundFXCompressor8 object and is an effect that reduces the fluctuation of an audio signal above a certain amplitude. A Compression object is obtained by calling GetObjectInPath on the audio buffer that supports the audio effect. The Compression object interface includes a GetAllParameters method that retrieves the compressor parameters of an audio buffer, and includes a SetAllParameters method that sets the compressor parameters of the audio buffer. The Compression effect includes parameters contained in a DSFXChorus structure for a compression effect.

An Attack parameter identifies a time in milliseconds before compression reaches its full value. A default time is ten (10) milliseconds, however a minimum and a maximum time can be defined. A Gain parameter identifies an output gain of an audio signal after compression which is by default zero dB. A minimum and a maximum gain can also be defined. An PreDelay parameter identifies a time in milliseconds after a threshold is reached. A default predelay is four (4) milliseconds, however a minimum and a maximum time can be defined.

A Ratio parameter identifies a compression ratio having a default value of three, which means a 3:1 compression. A minimum and a maximum ratio can also be defined. A Release parameter identifies a speed at which compression is stopped after audio input drops below a threshold. A default speed is two-hundred (200) milliseconds, however a minimum and a maximum time can be defined for a range of values. A Threshold parameter identifies a point at which compression begins, which is by default is −20 dB. A minimum and a maximum threshold can also be defined for a range of values.

A Distortion effect is represented by a DirectSoundFXDistortion8 object and is an effect that achieves distortion by adding harmonics to an audio signal such that, as the level increases, the top of the waveform becomes squared off or clipped. A Distortion object is obtained by calling GetObjectInPath on the audio buffer that supports the audio effect. The Distortion object interface includes a GetAllParameters method that retrieves the distortion parameters of an audio buffer, and includes a SetAllParameters method that sets the distortion parameters of the audio buffer. The Distortion effect includes parameters contained in a DSFXDistortion structure for a distortion effect.

A Gain parameter identifies an amount of audio signal change after distortion over a defined range. A default gain is zero dB, however a minimum and a maximum dB value can be defined. An Edge parameter identifies a percentage of distortion intensity over a defined range of values. A default parameter value is fifty (50) percent, however a minimum and a maximum percentage can be defined. A PostEQCenterFrequency parameter identifies a center frequency of harmonic content addition over a defined frequency range. A default frequency is four-thousand (4000) Hz, however a minimum and a maximum frequency can be defined for a range of values.

A PostEQBandwidth parameter identifies a width of a frequency band that determines a range of harmonic content addition over a defined bandwidth range. A default frequency is four-thousand (4000) Hz, however a minimum and a maximum frequency can be defined for a range of values. A PreLowpassCutoff parameter identifies a filter cutoff for high-frequency harmonics attenuation over a defined range of values. A default frequency is four-thousand (4000) Hz, however a minimum and a maximum frequency can be defined for a range of values.

An Echo effect is represented by a DirectSoundFXEcho8 object and is an echo effect that causes an audio sound to be repeated after a fixed-time delay. An Echo object is obtained by calling GetObjectInPath on the audio buffer that supports the audio effect. The Echo object interface includes a GetAllParameters method that retrieves the echo parameters of an audio buffer, and includes a SetAllParameters method that sets the echo parameters of the audio buffer. The Echo effect includes parameters contained in a DSFXEcho structure for an echo effect.

A WetDryMix parameter identifies the ratio of processed audio signal to unprocessed audio signal. A Feedback parameter identifies the percentage of an output audio signal that is fed back into the audio effect input. A default feedback is zero, however a minimum and a maximum feedback can be defined for a range of values. A LeftDelay parameter identifies a delay in milliseconds for a left audio channel. A default left delay is 333 milliseconds, however a minimum and a maximum left delay can be defined. A RightDelay parameter identifies a delay in milliseconds for a right audio channel. A default right delay is 333 milliseconds, however a minimum and a maximum right delay can be defined. A PanDelay parameter identifies a value that specifies whether to swap left and right delays with each successive echo. The default value is zero which indicates that there is no swap. A minimum and a maximum pan delay can be defined, however.

An Environmental Reverberation effect is represented by an IDirectSoundFXI3DL2Reverb8 object and is a reverb effect in accordance with the Interactive 3-D Audio, Level 2 (I3DL2) specification, published by the Interactive Audio Special Interest Group. Sounds reaching the listener have three temporal components: a direct path, early reflections, and late reverberation.

Direct path is the audio signal that travels straight from the sound source to the listener, without bouncing or reflecting off of any surface, and is therefore the one direct path signal. Early reflections are the audio signals that reach the listener after one or two reflections off of surfaces such as walls, a floor, and a ceiling. If an audio signal is the result of the sound bouncing off of only one wall on its way to the listener, it is called a first-order reflection. If the audio signal bounces off of two walls before reaching the listener, it is called a second-order reflection. Typically, a person can only perceive first and second-order reflections. Late reverberation, or simply reverb, is a combination of lower-order reflections and a dense succession of echoes having diminishing intensity. The combination of early reflections and late reverberation is also referred to as the “room effect”.

Reverb properties include the following properties. Attenuation of early reflections and late reverberation. A roll-off factor which is the rate that reflected signals become attenuated over a distance. A reflections delay which is the interval between the arrival of a direct-path signal and the arrival of the first early reflections. A reverb delay which is the interval between the first of the early reflections and the onset of late reverberation. A decay time which is the interval between the onset of late reverberation and the time when its intensity has been reduced by 60 dB. Diffusion which is proportional to the number of echoes per second in the late reverberation. Density which is proportional to the number of resonances per hertz in the late reverberation. Lower densities produce hollow sounds like those found in small rooms.

The Reverb object is obtained by calling GetObjectInPath on the audio buffer that supports the audio effect. The Reverb object interface includes a GetAllParameters method that retrieves the reverb parameters of an audio buffer, and includes a SetAllParameters method that sets the reverb parameters of the audio buffer. The Reverb object interface also includes a GetQuality method and a SetQuality method. The Reverb effect includes parameters contained in a DSFXI3DL2Reverb structure for a reverb effect.

A Room parameter identifies an attenuation of the room effect, in millibels (mB) in a defined range of values. A default parameter value is −1000 mB, however a minimum and a maximum value can be defined for a range of values. A RoomHF parameter identifies an attenuation of the room high-frequency effect, in mB in a defined range of values. A default parameter value is zero mB, however a minimum and a maximum value can be defined for a range of values. A RoomRolloffFactor parameter identifies a roll-off factor for the reflected signals in a defined range of values. A DecayTime parameter identifies a decay time, in seconds, in a defined range of time values. A default time is 1.49 seconds, however a minimum and a maximum time can be defined for a range of times.

A DecayHFRatio parameter identifies a ratio of the decay time at high frequencies to the decay time at low frequencies. A default ratio is 0.83, however a minimum and a maximum ratio can be defined for a range of values. A Reflections parameter identifies an attenuation of early reflections relative to the Room parameter, in mB, in a defined range of values. A default parameter value is −2602 mB, however a minimum and a maximum value can be defined for a range of values.

A ReflectionsDelay parameter identifies a delay time of the first reflection relative to the direct path, in seconds, in a defined range of values. A default delay is 0.007 seconds, however a minimum and a maximum time can be defined for a range of times. A Reverb parameter identifies an attenuation of late reverberation relative to the Room parameter. A default reverb is 200 mB, however a minimum and a maximum reverb value can be defined for a range of values. A ReverbDelay parameter identifies a time limit between the early reflections and the late reverberation relative to the time of the first reflection. A default reverb delay is 0.011 seconds, however a minimum and a maximum reverb delay can be defined.

A Diffusion parameter identifies an echo density in the late reverberation decay, in percent, over a defined range of values. A default parameter value is one-hundred (100) percent, however a minimum and a maximum value can be defined. A Density parameter identifies a modal density in the late reverberation decay, in percent, over a defined range of values. A default parameter value is one-hundred (100) percent, however a minimum and a maximum value can be defined. An HFReference parameter identifies a reference high frequency, in hertz, over a defined range of values. A default frequency is 5000 Hz, however a minimum and a maximum frequency can be defined.

A Flange effect is represented by a DirectSoundFX-Flanger8 object and is an echo effect in which the delay between the original audio signal and its echo is very short and varies over time, resulting in a sweeping sound. A Flange object is obtained by calling GetObjectInPath on the audio buffer that supports the audio effect. The Flange object interface includes a GetAllParameters method that retrieves the flange parameters of an audio buffer, and includes a SetAllParameters method that sets the flange parameters of the audio buffer. The Flange effect includes parameters contained in a DSFXFlanger structure for the echo effect.

A WetDryMix parameter identifies the ratio of processed audio signal to unprocessed audio signal. A Depth parameter identifies a percentage by which the delay time is modulated by a low-frequency oscillator, in hundredths of a percentage point, over a defined range of values. A default parameter value is twenty-five (25), however a minimum and a maximum value can be defined. A Feedback parameter identifies the percentage of an output audio signal that is fed back into the audio effect input. A Frequency parameter identifies a frequency of the low-frequency oscillator over a defined range of values.

A Waveform parameter identifies a waveform of the low-frequency oscillator, which includes a sine wave and a triangle wave. A Delay parameter identifies a time in milliseconds that the audio input is delayed before it is played back. A Phase parameter identifies a phase differential between left and right low-frequency oscillators, over a defined range of phase values. The range of phase values include negative 180, negative 90, zero, positive 90, and positive 180.

A Gargle effect is represented by a DirectSoundFX-Gargle8 object and is an effect that modulates the amplitude of an audio signal. A Gargle object is obtained by calling GetObjectInPath on the audio buffer that supports the audio effect. The Gargle object interface includes a GetAllParameters method that retrieves the gargle parameters of an audio buffer, and includes a SetAllParameters method that sets the gargle parameters of the audio buffer. The Gargle effect includes parameters contained in a DSFXGargle structure for an amplitude modulation effect.

A RateHz parameter identifies a rate of modulation, in Hertz, over a defined range of Hertz rates. A WaveShape parameter identifies a shape of the modulation wave which includes a triangular wave and a square wave.

A Parametric Equalizer effect is represented by a Direct-SoundFXParamEq8 object and is an effect that amplifies or attenuates signals of a given frequency. Parametric equalizer effects for different pitches can be applied in parallel by setting multiple instances of the parametric equalizer effect on the same buffer. In this implementation, an application program can have tone control similar to that provided by a hardware equalizer. A Parametric Equalizer object is obtained by calling GetObjectInPath on the audio buffer that supports the audio effect. The Parametric Equalizer object interface includes a GetAllParameters method that retrieves the parametric equalizer parameters of an audio buffer, and includes a SetAllParameters method that sets the parametric equalizer parameters of the audio buffer. The Parametric Equalizer effect includes parameters contained in a DSFX-ParamEq structure for the effect.

A Center parameter identifies a center frequency in a defined range of hertz values. A Bandwidth parameter identifies a bandwidth, in semitones, over a defined range of values. A Gain parameter identifies a gain over a defined range of values.

A Waves Reverberation effect is represented by a Direct-SoundFXWavesReverb8 object and is a reverberation effect. A Waves Reverberation object is obtained by calling GetObjectInPath on the audio buffer that supports the audio effect. The Waves Reverberation object interface includes a GetAllParameters method that retrieves the reverberation parameters of an audio buffer, and includes a SetAllParameters method that sets the reverberation parameters of the audio buffer. The Waves Reverberation effect includes parameters contained in a DSFXWavesReverb structure for the effect.

An InGain parameter identifies an input gain of an audio signal, in decibels (dB), over a defined range of decibel values. A default gain is zero dB, however a minimum and a maximum gain can be defined for a range of gain values. A ReverbMix parameter identifies reverb mix, in dB, over a defined range of decibel values. A default parameter value is zero dB, however a minimum and a maximum value can be defined for a range of values. A ReverbTime parameter identifies reverb time in a defined range of milliseconds with a default reverb time of 1000 ms. A minimum and a maximum reverb time can also be defined. A HighFreqRTRatio parameter identifies a high frequency ratio in a defined range of values with a default frequency ratio of 0.001.

Exemplary Computing System and Environment

Figure 9:
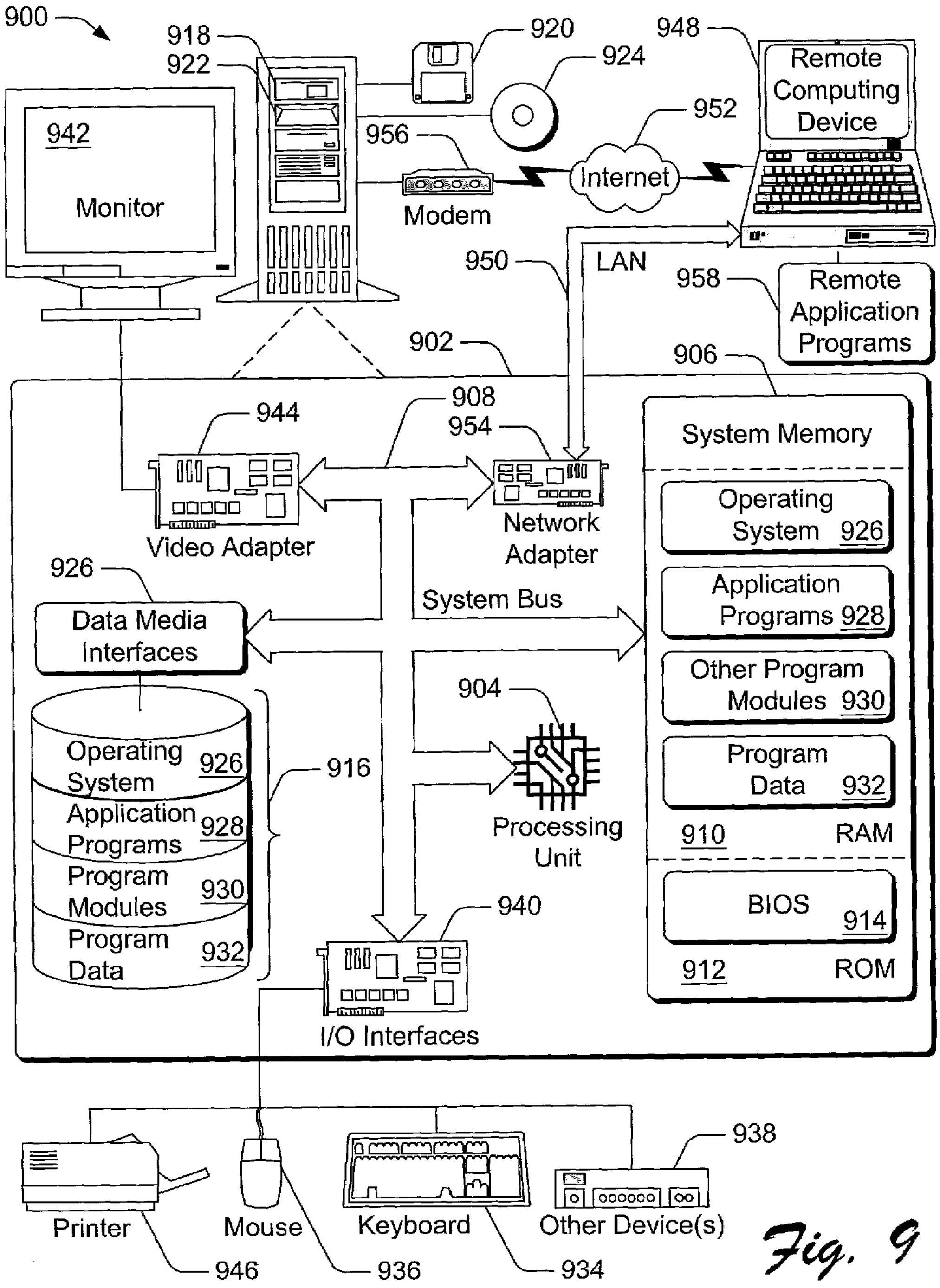
FIG. 9 is a diagram of computing systems, devices, and components in an environment that can be used to implement the systems and methods described herein.

FIG. 9 illustrates an example of a computing environment 900 within which the computer, network, and system architectures described herein can be either fully or partially implemented. Exemplary computing environment 900 is only one example of a computing system and is not intended to suggest any limitation as to the scope of use or functionality of the network architectures. Neither should the computing environment 900 be interpreted as having any dependency or requirement relating to any one or combination of components illustrated in the exemplary computing environment 900.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

Audio generation may be described in the general context of computer-executable instructions, such as program modules, being executed by a computer. Generally, program modules include routines, programs, objects, components, data structures, etc. that perform particular tasks or implement particular abstract data types. Audio generation may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing system in the form of a computer 902. The components of computer 902 can include, by are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 902 typically includes a variety of computer readable media. Such media can be any available media that is accessible by computer 902 and includes both volatile and non-volatile media, removable and non-removable media. The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 can also include other removable/non-removable, volatile/non-volatile computer storage media. By way of example, FIG. 9 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 926. Alternatively, the hard disk drive 916, magnetic disk drive 918, and optical disk drive 922 can be connected to the system bus 908 by a SCSI interface (not shown).

The disk drives and their associated computer-readable media provide nonvolatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of an audio generation system.

Computer system 902 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer system 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet. When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components, such as the operating system, are illustrated herein as discrete blocks, although it is recognized that such programs and components reside at various times in different storage components of the computer system 902, and are executed by the data processor(s) of the computer.

CONCLUSION

Although the systems and methods have been described in language specific to structural features and/or procedures, it is to be understood that the invention defined in the appended claims is not necessarily limited to the specific features or procedures described. Rather, the specific features and procedures are disclosed as preferred forms of implementing the claimed invention.

The invention claimed is:

1. An audio buffer, comprising:

a first audio effect resource configured to receive audio data from an audio data source and modify the audio data to generate modified audio data that is routed to at least one additional audio buffer; and at least a second audio effect resource configured to receive the modified audio data from the first audio effect resource and further modify the modified audio data to generate a modified audio data output of the audio buffer the modified audio data output and an additional modified audio data output of the additional audio buffer being combined in an output mixing component that streams the combined modified audio data to an audio rendering component.

2. An audio buffer as recited in claim 1, wherein the second audio effect resource is further configured to communicate the modified audio data output to at least a third audio buffer.

3. An audio buffer as recited in claim 1, wherein the first audio effect resource is further configured to digitally modify the audio data, and wherein the second audio effect resource is further configured to digitally modify the modified audio data received from the first audio effect resource.

4. An audio buffer as recited in claim 1, further comprising an audio data input mixer configured to combine the audio data received from the audio data source with additional audio data received from a second audio data source to generate a stream of combined audio data, the audio data input mixer further configured to route the stream of combined audio data to the first audio effect resource.

5. An audio buffer as recited in claim 1, further comprising an audio data input mixer configured to combine one or more streams of audio data received from multiple audio buffers to generate a stream of combined audio data, the audio data input mixer further configured to route the stream of combined audio data to the first audio effect resource.

6. An audio buffer as recited in claim 1, wherein the first audio effect resource is instantiated as a programming object having an interface that is callable by a software component, the programming object configured to implement software resources to modify the audio data.

7. An audio buffer as recited in claim 1, wherein the first audio effect resource is instantiated as a programming object having an interface that is callable by a software component, the programming object configured to manage hardware resources to modify the audio data.

8. An audio buffer as recited in claim 1, wherein:

the first audio effect resource is instantiated as a first programming object having an interface that is callable by a software component, the first programming object configured to implement software resources to modify the audio data; and the second audio effect resource is instantiated as a second programming object having an interface that is callable by the software component, the second programming object configured to manage hardware resources to modify the modified audio data.

9. An audio buffer as recited in claim 1, wherein the first audio effect resource includes a component identifier that indicates the first audio effect resource is to be implemented with software resources.

10. An audio buffer as recited in claim 1, wherein the first audio effect resource includes a component identifier that indicates the first audio effect resource is to be implemented with hardware resources.

11. An audio buffer as recited in claim 1, wherein the first audio effect resource includes a first resource component identifier that indicates the first audio effect resource is to be implemented with software resources, and wherein the second audio effect resource includes a second resource component identifier that indicates the second audio effect resource is to be implemented with hardware resources.

12. An audio buffer as recited in claim 1, wherein the first audio effect resource includes a component identifier that indicates the first audio effect resource is to be implemented with hardware resources, and if the hardware resources are not available, the first audio effect resource is to be implemented with software resources.

13. An audio buffer as recited in claim 1, wherein the first audio effect resource includes a component identifier that indicates the first audio effect resource is to be implemented with software resources, and if the software resources are not available, the first audio effect resource is to be implemented with hardware resources.

14. An audio buffer as recited in claim 1, wherein the first audio effect resource includes a component identifier that indicates the first audio effect resource is to be implemented with hardware resources, and if the hardware resources that implement the first audio effect resource become unavailable after the audio effect resource has been implemented, the first audio effect resource is to be implemented with software resources.

15. An audio buffer as recited in claim 1, wherein:

the first audio effect resource includes a component identifier that indicates the first audio effect is to be implemented with hardware resources, and if the hardware resources are not available:

the first audio effect resource is not implemented; and the second audio effect resource is further configured to receive the audio from the audio data source and modify the audio data to generate the modified audio data.

16. An audio generation system, comprising:

an audio data source configured to generate a stream of audio data;

an audio buffer that includes a first audio effect resource and at least a second audio effect resource, the first audio effect resource configured to receive the stream of audio data from the audio data source and modify the audio data to generate a modified audio data, the second audio effect resource configured to receive the modified audio data and further modify the modified audio data to generate a modified audio data output of the audio buffer;

at least an additional audio buffer configured to receive the modified audio data from the first audio effect resource and generate an additional modified audio data output of the additional audio buffer; and an audio component configured to receive and combine the modified audio data output from the audio buffer and the additional modified audio data output from the additional audio buffer, and produce an audio rendition corresponding to the combined modified audio data.

17. An audio generation system as recited in claim 16, wherein the first audio effect resource is further configured to communicate the modified audio data to the at least additional audio buffer.

18. An audio generation system as recited in claim 16, wherein the first audio effect resource is further configured to digitally modify the audio data.

19. An audio generation system as recited in claim 16, further comprising an audio data input mixer implemented as a component of the audio buffer, the audio data input mixer configured to combine the stream of audio data received from the audio data source with a second stream of audio data received from a second audio data source to generate a stream of combined audio data, the audio data input mixer further configured to route the stream of combined audio data to the first audio effect resource.

20. An audio generation system as recited in claim 16, further comprising an audio data input mixer implemented as a component of the audio buffer, the audio data input mixer configured to combine one or more streams of audio data received from multiple audio buffers to generate a stream of combined audio data, the audio data input mixer further configured to route the stream of combined audio data to the first audio effect resource.

21. An audio generation system as recited in claim 16, wherein the first audio effect resource is instantiated as a programming object having an interface that is callable by a software component, the programming object configured to implement software resources to modify the audio data.

22. An audio generation system as recited in claim 16, wherein the first audio effect resource is instantiated as a programming object having an interface that is callable by a software component, the to programming object configured to manage hardware resources to modify the audio data.

23. An audio generation system as recited in claim 16, wherein the first audio effect resource includes a component identifier that indicates the first audio effect resource is to be implemented with software resources.

24. An audio generation system as recited in claim 16, wherein the first audio effect resource includes a component identifier that indicates the first audio effect resource is to be implemented with hardware resources.

25. An audio generation system as recited in claim 16, wherein the first audio effect resource includes a component identifier that indicates the first audio effect resource is to be implemented with hardware resources, and if the hardware resources are not available, the first audio effect resource is to be implemented with software resources.

26. An audio generation system as recited in claim 16, wherein the first audio effect resource includes a component identifier that indicates the first audio effect resource is to be implemented with software resources, and if the software resources are not available, the first audio effect resource is to be implemented with hardware resources.

27. An audio generation system as recited in claim 16, wherein the first audio effect resource includes a component identifier that indicates the first audio effect resource is to be implemented with hardware resources, and if the hardware resources that implement the first audio effect resource become unavailable, the first audio effect resource is to be implemented with software resources.

28. An audio generation system as recited in claim 16, wherein:

the first audio effect resource is instantiated as a first programming object having an interface that is callable by a software component, the first programming object configured to implement software resources to modify the audio data; and the second audio effect resource is instantiated as a second programming object having an interface that is callable by the software component, the second programming object configured to manage hardware resources to modify the modified audio data received from the first audio effect resource.

29. An audio generation system as recited in claim 16, wherein the first audio effect resource includes a first resource component identifier that indicates the first audio effect resource is to be implemented with software resources, and wherein the second audio effect resource includes a second resource component identifier that indicates the second audio effect resource is to be implemented with hardware resources.

30. An audio generation system, comprising:

a first audio effect resource implemented as a component of an audio buffer, the first audio effect resource configured to receive a stream of audio data generated by an audio data source;

at least a second audio effect resource implemented as a component of the audio buffer, the first and second audio effect resources forming an audio effect resources chain configured to modify the audio data and generate a modified audio data output of the audio buffer;

an additional audio effect resource implemented as a component of an additional audio buffer, the additional audio effect resource configured to receive the modified audio data output from the audio buffer and generate an additional modified audio data output from the additional audio buffer; and an audio rendering component configured to receive and combine the modified audio data output from the audio buffer and the additional modified audio data output from the additional audio buffer to produce an audio rendition corresponding to the combined modified audio data outputs.

31. An audio generation system as recited in claim 30, further comprising an audio data input mixer implemented as a component of the audio buffer, the audio data input mixer configured to combine the stream of audio data received from the audio data source with a second stream of audio data received from a second audio data source to generate a stream of combined audio data, the audio data input mixer further configured to route the stream of combined audio data to the first audio effect resource.

32. An audio generation system as recited in claim 30, further comprising an audio data input mixer implemented as a component of the audio buffer, the audio data input mixer configured to combine one or more streams of audio data received from multiple audio buffers to generate a stream of combined audio data, the audio data input mixer further configured to route the stream of combined audio data to the first audio effect resource.

33. An audio generation system as recited in claim 30, wherein:

the first audio effect resource is instantiated as a first programming object having an interface that is callable by a software component, the first programming object configured to implement software resources to modify the audio data; and the second audio effect resource is instantiated as a second programming object having an interface that is callable by the software component, the second programming object configured to manage hardware resources to modify the audio data.

34. An audio generation system as recited in claim 30, wherein the first audio effect resource and the second audio effect resource each include a component identifier that indicates the audio effect resources are to be implemented with software resources.

35. An audio generation system as recited in claim 30, wherein the first audio effect resource and the second audio effect resource each include a component identifier that indicates the audio effect resources are to be implemented with hardware resources.

36. An audio generation system as recited in claim 30, wherein the first audio effect resource and the second audio effect resource each include a component identifier that indicates the audio effect resources are to be implemented with hardware resources, and if the hardware resources that implement the audio effect resources become unavailable, the audio effect resources are to be implemented with software resources.

37. An audio generation system as recited in claim 30, wherein:

the first audio effect resource includes a component identifier that indicates the first audio effect resource is to be implemented with hardware resources, and if the hardware resources are not available:

the first audio effect resource is not implemented; and the second audio effect resource is configured to receive the stream of audio data from the audio data source and modify the audio data to generate the modified audio data output of the audio buffer.

38. A method for processing audio data, comprising:

receiving a stream of audio data from an audio data source;

modifying the audio data with an audio effect resource in an audio buffer to generate modified audio data;

routing the modified audio data to at least an additional audio effect resource in the audio buffer to further modify the modified audio data to generate a modified audio data output of the audio buffer;

routing the modified audio data from the audio effect resource to an additional audio buffer that generates an additional modified audio data output;

combining the modified audio data output from the audio buffer with the additional modified audio data output from the additional audio buffer in an output mixing component that generates a stream of combined modified audio data; and communicating the stream of combined modified audio data to an audio rendering component that produces an audio rendition corresponding to the stream of combined modified audio data.

39. A method for processing audio data as recited in claim 38, wherein modifying the audio data includes digitally modifying the audio data with the audio effect resource.

40. A method for processing audio data as recited in claim 38, further comprising mixing the stream of audio data received from the audio data source with a second stream of audio data received from a second audio data source to generate a stream of combined audio data, and routing the stream of combined audio data to the audio effect resource.

41. A method for processing audio data as recited in claim 38, further comprising mixing one or more streams of audio data received from multiple audio buffers to generate a stream of combined audio data, and routing the stream of combined audio data to the audio effect resource.

42. A method for processing audio data as recited in claim 38, further comprising instantiating the audio effect resource as a programming object having an interface that is callable by a software component, the programming object implementing software resources for modifying the audio data.

43. A method for processing audio data as recited in claim 38, further comprising instantiating the audio effect resource as a programming object having an interface that is callable by a software component, the programming object managing hardware resources for modifying the audio data.

44. A method for processing audio data as recited in claim 38, further comprising implementing the audio effect resource with software resources according to a component identifier of the audio effect resource.

45. A method for processing audio data as recited in claim 38, further comprising implementing the audio effect resource with hardware resources according to a component identifier of the audio effect resource.

46. A method for processing audio data as recited in claim 38, further comprising determining that hardware resources are not available to implement the audio effect resource, and implementing the audio effect resource with software resources.

47. A method for processing audio data as recited in claim 38, further comprising determining that software resources are not available to implement the audio effect resource, and implementing the audio effect resource with hardware resources.

48. A method for processing audio data as recited in claim 38, further comprising:

implementing the audio effect resource with hardware resources;

determining that the hardware resources have become unavailable; and implementing the audio effect resource with software resources.

* * * * *